(12) United States Patent
Watanabe et al.

(10) Patent No.: US 10,677,448 B2
(45) Date of Patent: Jun. 9, 2020

(54) LIGHTING DEVICE

(71) Applicant: MAXELL, LTD., Kyoto (JP)

(72) Inventors: Katsuyuki Watanabe, Kyoto (JP);
Tatsuya Ishikawa, Kyoto (JP); Maki Hanada, Kyoto (JP); Sosuke Hisamatsu, Kyoto (JP); Hiroyuki Urata, Kyoto (JP); Takuya Shimizu, Kyoto (JP)

(73) Assignee: MAXELL, LTD., Kyoto (JP)

( * ) Notice: Subject to any disclaimer, the term of this patent is extended or adjusted under 35 U.S.C. 154(b) by 143 days.

(21) Appl. No.: 15/764,083

(22) PCT Filed: Sep. 28, 2015

(86) PCT No.: PCT/JP2015/077286
§ 371 (c)(1),
(2) Date: Mar. 28, 2018

(87) PCT Pub. No.: WO2017/056147
PCT Pub. Date: Apr. 6, 2017

(65) Prior Publication Data
US 2018/0306431 A1    Oct. 25, 2018

(51) Int. Cl.
*F21V 33/00* (2006.01)
*F21V 23/04* (2006.01)
(Continued)

(52) U.S. Cl.
CPC ...... *F21V 33/0052* (2013.01); *F21V 23/0435* (2013.01); *F21V 23/0471* (2013.01);
(Continued)

(58) Field of Classification Search
CPC ............ F21V 33/0052; F21V 23/0435; F21V 23/0471; H04N 9/3179; H04N 9/3194;
(Continued)

(56) References Cited

U.S. PATENT DOCUMENTS 9,470,412 B2   10/2016   Kasuga
2008/0192209 A1   8/2008   Duine et al.
(Continued)

FOREIGN PATENT DOCUMENTS

JP    2003-016831 A    1/2003
JP    2006-330708 A   12/2006
(Continued)

OTHER PUBLICATIONS

Japanese Office Action dated Jul. 2, 2019 for the Japanese Patent Application No. 2017-542521.
Japanese Office Action dated Dec. 4, 2018 for the Japanese Patent Application No. 2017-542521.

*Primary Examiner* — Jerry L Brooks
(74) *Attorney, Agent, or Firm* — Volpe and Koenig, P.C.

(57) ABSTRACT

Provided is a video-image projection function-equipped lighting device more convenient for a user. A lighting device includes a lighting unit (200) for emitting illumination light, and a projection-type video-image display unit (100) for projecting a video image. The projection-type video-image display unit (100) includes a content editing means for editing content of the video image to be displayed.

4 Claims, 24 Drawing Sheets

| No. | TIMER SETTING | DETAIL | | PERSON SENSOR | MESSAGE (SPECIFIC EXAMPLE) | MESSAGE SENDER A | MESSAGE RECIPIENT B | ILLUMINATION STATE | |
|---|---|---|---|---|---|---|---|---|---|
| | | | | | | | | DAYTIME | AFTER EVENING |
| 1 | SPECIFIC DAY | MEMORIAL DAY | ·BIRTHDAY | ON | HAPPY BIRTHDAY! | FATHER AND MOTHER | CHILD | OFF | ON |
| | | | ·WEDDING ANNIVERSARY | ON | Happy Anniversary | HUSBAND | WIFE | OFF | ON |
| 5 | | MESSAGE | | ON | DAD, WELCOME BACK HOME | WIFE | HUSBAND | OFF | ON |
| 2 | EVERYDAY | MEAL TIME | ·MENU AND THE LIKE | OFF or ON | TIME FOR DINNER | FATHER AND MOTHER | CHILD | OFF | ON |
| 3 | EVERYDAY | BED TIME | ·MESSAGE | OFF or ON | GOOD NIGHT! | FATHER AND MOTHER | CHILD | OFF | ON |
| 4 | EVERYDAY | MEDICATION TIME | ·TYPE OF MEDICINE AND THE LIKE | OFF or ON | TIME FOR TAKING MEDICINE | HUSBAND AND WIFE | GRAND PARENTS | OFF | ON |

(51) Int. Cl.
*G06F 3/041* (2006.01)
*H04N 9/31* (2006.01)
*H05B 47/10* (2020.01)
*H05B 47/19* (2020.01)
*H05B 47/105* (2020.01)
*F21S 8/06* (2006.01)
*H05B 47/16* (2020.01)
*G06F 3/01* (2006.01)

(52) U.S. Cl.
CPC ......... *H04N 9/3179* (2013.01); *H04N 9/3194* (2013.01); *H05B 47/10* (2020.01); *H05B 47/105* (2020.01); *H05B 47/19* (2020.01); *F21S 8/06* (2013.01); *G06F 3/017* (2013.01); *G06F 3/041* (2013.01); *H05B 47/16* (2020.01); *Y02B 20/42* (2013.01)

(58) Field of Classification Search
CPC ............... H05B 37/02; H05B 37/0227; H05B 37/0272; H05B 37/0281; F21S 8/06; G06F 3/017; G06F 3/041; Y02B 20/42
USPC .......................................................... 353/87
See application file for complete search history.

(56) References Cited

U.S. PATENT DOCUMENTS

| | | |
|---|---|---|
| 2009/0262098 A1 | 10/2009 | Yamada |
| 2010/0289664 A1 | 11/2010 | Mizushima et al. |
| 2013/0343601 A1* | 12/2013 | Jia ..................... G06K 9/00355 382/103 |
| 2014/0253512 A1 | 9/2014 | Narikawa et al. |
| 2015/0062048 A1* | 3/2015 | Park ..................... G06F 3/1423 345/173 |
| 2015/0168821 A1* | 6/2015 | Negretti ............. H05B 37/0227 353/85 |
| 2017/0041581 A1 | 2/2017 | Ikeda et al. |

FOREIGN PATENT DOCUMENTS

| | | |
|---|---|---|
| JP | 2008-542989 A | 11/2008 |
| JP | 2009-258569 A | 11/2009 |
| JP | 2012-186118 A | 9/2012 |
| JP | 2014-035522 A | 2/2014 |
| JP | 2014-174833 A | 9/2014 |
| WO | 2010/044204 A1 | 4/2010 |
| WO | 2015/098187 A1 | 7/2015 |

* cited by examiner

FIG. 4
(A)
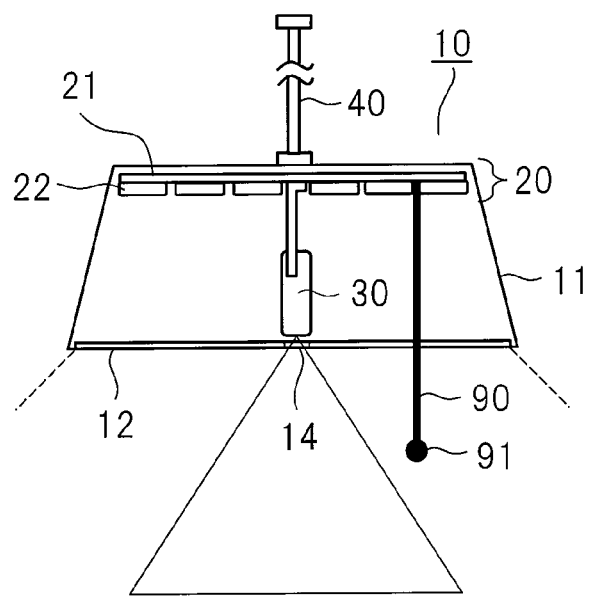
(B)
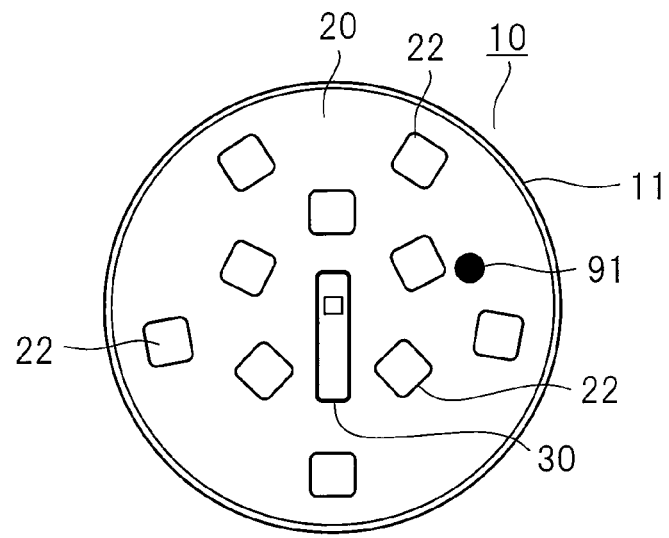

FIG. 5
(A)
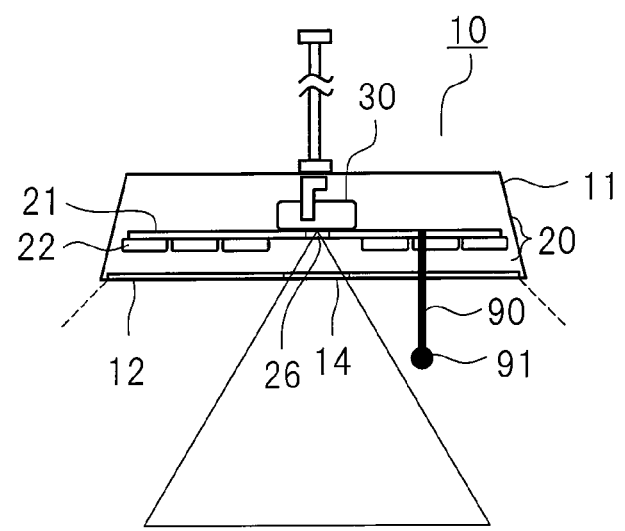
(B)
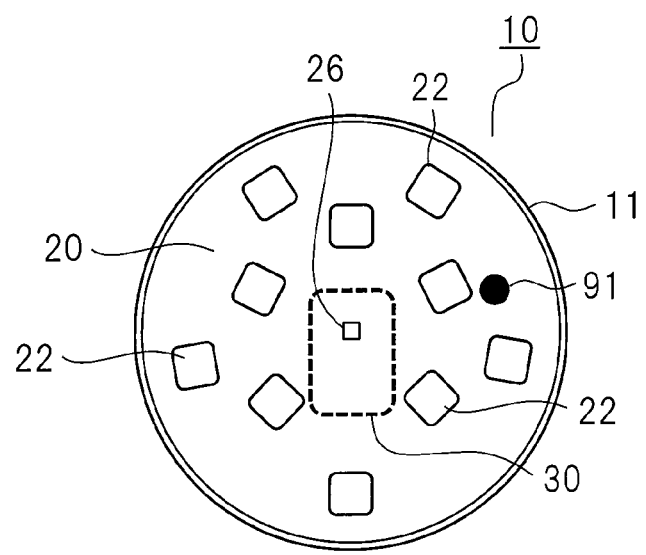

FIG. 6
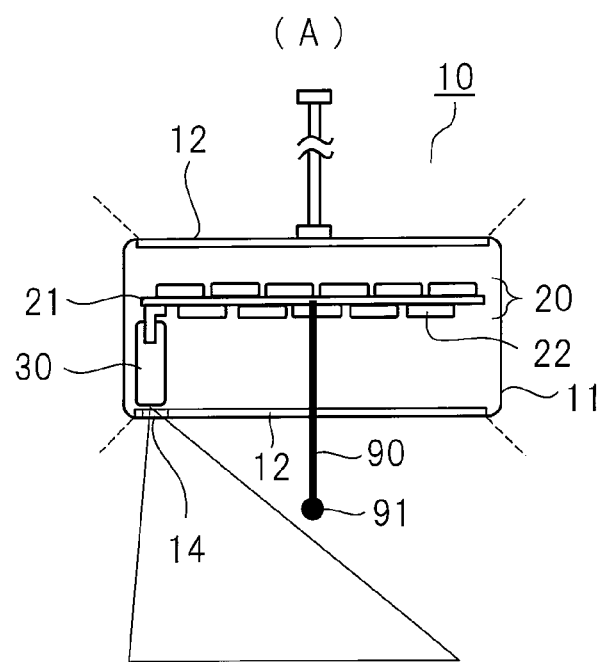
(A)
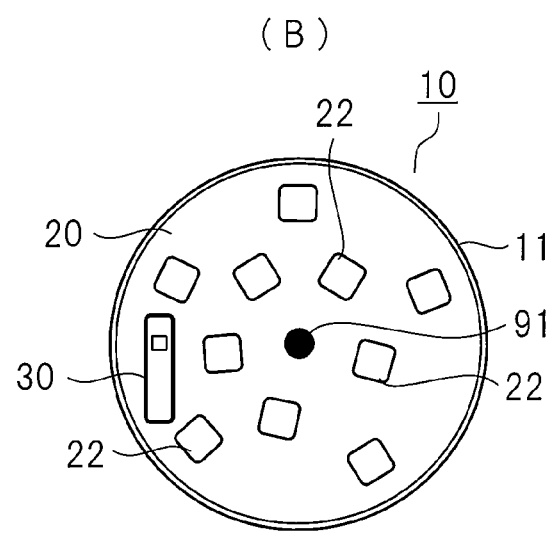
(B)

FIG. 7
(A)
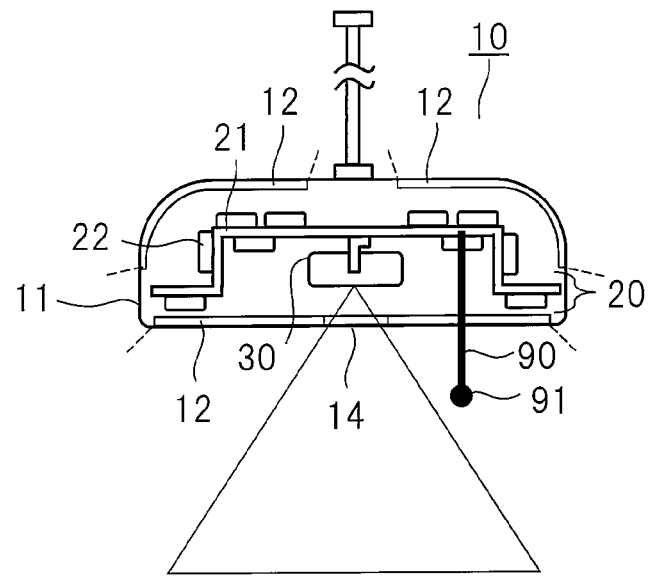
(B)
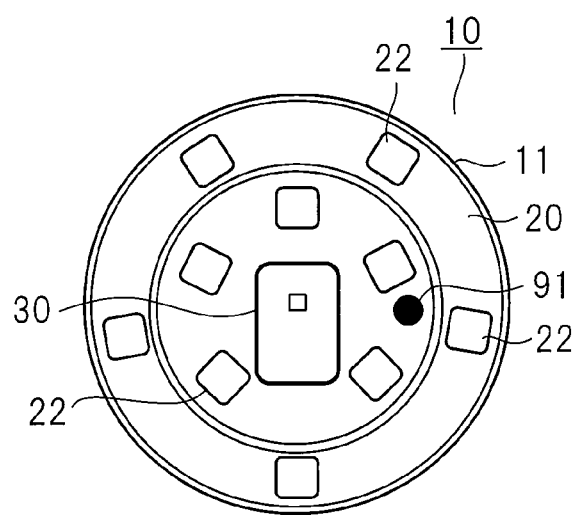

FIG. 8
(A)
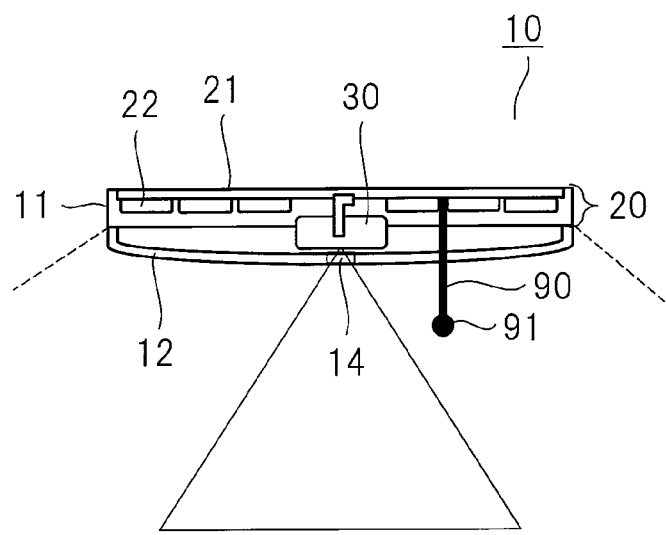
(B)
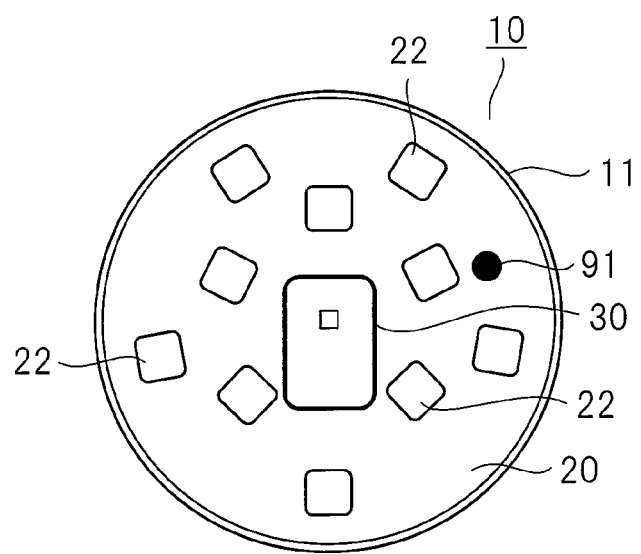

FIG. 9
(A)
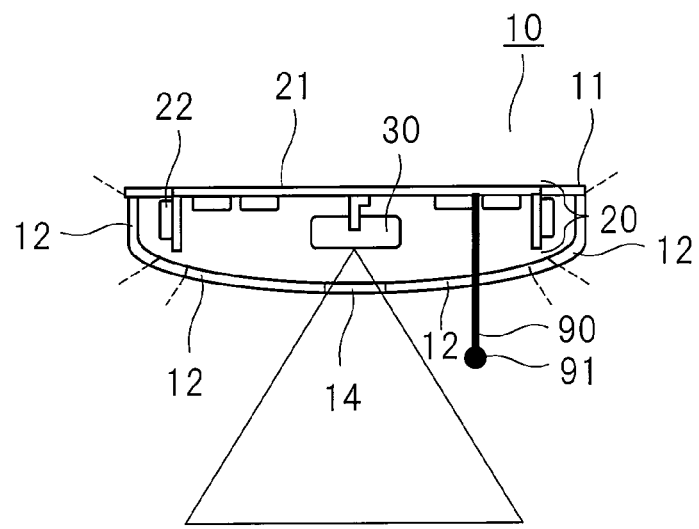
(B)
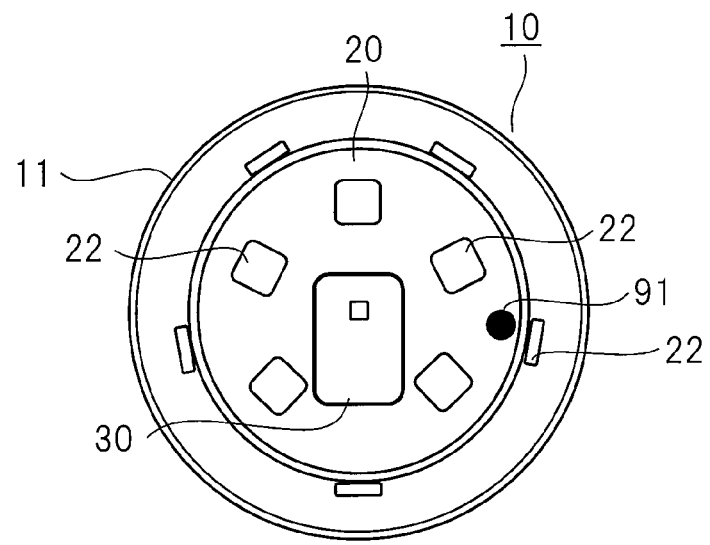

FIG. 13

| No. | TIMER SETTING | | DETAIL | PERSON SENSOR | MESSAGE (SPECIFIC EXAMPLE) | MESSAGE SENDER A | MESSAGE RECIPIENT B | ILLUMINATION STATE | |
|---|---|---|---|---|---|---|---|---|---|
| | | | | | | | | DAYTIME | AFTER EVENING |
| 1 | SPECIFIC DAY | MEMORIAL DAY | ·BIRTHDAY | ON | HAPPY BIRTHDAY! | FATHER AND MOTHER | CHILD | OFF | ON |
| | | | ·WEDDING ANNIVERSARY | ON | Happy Anniversary | HUSBAND | WIFE | OFF | ON |
| 5 | | MESSAGE | | ON | DAD, WELCOME BACK HOME | WIFE | HUSBAND | OFF | ON |
| 2 | EVERYDAY | MEAL TIME | ·MENU AND THE LIKE | OFF or ON | TIME FOR DINNER | FATHER AND MOTHER | CHILD | OFF | ON |
| 3 | EVERYDAY | BED TIME | ·MESSAGE | OFF or ON | GOOD NIGHT! | FATHER AND MOTHER | CHILD | OFF | ON |
| 4 | EVERYDAY | MEDICATION TIME | ·TYPE OF MEDICINE AND THE LIKE | OFF or ON | TIME FOR TAKING MEDICINE | HUSBAND AND WIFE | GRAND PARENTS | OFF | ON |

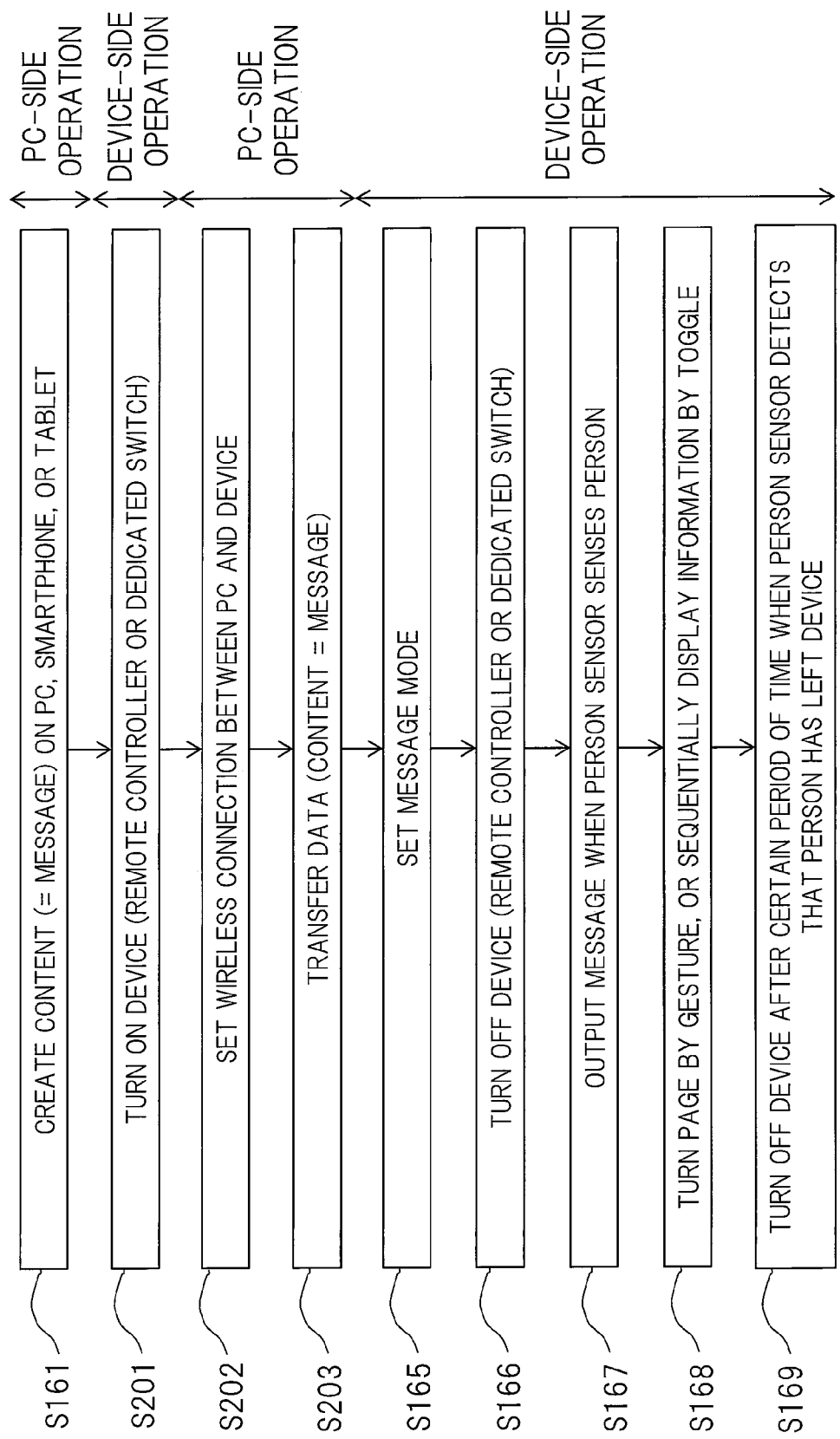

LIGHTING DEVICE

TECHNICAL FIELD

The present invention relates to a lighting device.

BACKGROUND ART

A technique for attaching a communication function module to a ceiling light is disclosed in Patent Document 1 as described above, the communication function module being attached to a ceiling or a wall surface and being capable of using various functions.

RELATED ART DOCUMENT

Patent Document

Patent Document 1: Japanese Patent Application Laid-open No. 2003-16831

SUMMARY OF THE INVENTION

Problems to be Solved by the Invention

However, Patent Document 1 does not disclose any control of light emission from lighting of a projector and an illumination light source. Therefore, there is no disclosure on control of: video-image projection of a projector which is a video-image projection function in a lighting device having the video-image projection function; and light emission of an illumination light source in the lighting device having the video-image projection function. In Patent Document 1, the projector is disclosed only in terms of a block diagram and a simplified outline. Patent Document 1 does not disclose a layout of an optical unit in view of arrangement of: an optical system or optical element; or a layout of the optical system or optical element of the projector in the lighting device. Therefore, with regard to the control of the video-image projection by the projector which is the video-image projection function in a video-image projection function-equipped lighting device and the control of the light emission of the illumination light source in the video-image projection function-equipped lighting device, there is no disclosure of the control etc. in view of an arrangement of the optical system or optical element or the layout of the optical system or optical element of the projector in the lighting device.

Patent Document 1 does not at all disclose a setting technique of a projection video image(s) in the video-image projection function-equipped lighting device.

Therefore, in a conventional technique, lighting control of the light source more convenient for a user(s) or a setting processing of the projection video image in the video-image projection function-equipped lighting device has not yet been considered sufficiently.

Thus, the present invention has been made in view of problems caused by the conventional technique described above, and an object of the present invention is to provide a video-image projection function-equipped lighting device which is more convenient for the user.

Means for Solving the Problems

An aspect for achieving the above object includes: a lighting unit for emitting illumination light; and a projection-type video-image display unit for projecting a video image(s), and the projection-type video display unit may be configured to have a content editing means for editing content of a video image(s) to be displayed.

Effects of the Invention

According to the present invention described above, the video-image projection function-equipped lighting device which is more convenient for the user can be provided.

BRIEF DESCRIPTIONS OF THE DRAWINGS

FIG. 4 is a side surface view and a bottom surface view illustrating an example of a layout (arrangement) of an optical unit and an illumination light source in a housing of a lighting device according to the present invention;

FIG. 5 is a side surface view and a bottom surface view illustrating an example of a layout (arrangement) of an optical unit and an illumination light source in a housing of a lighting device according to the present invention;

FIG. 6 is a side surface view and a bottom surface view illustrating an example of a layout (arrangement) of an optical unit and an illumination light source in a housing of a lighting device according to the present invention;

FIG. 7 is a side surface view and a bottom surface view illustrating an example of a layout (arrangement) of an optical unit and an illumination light source in a housing of a lighting device according to the present invention;

FIG. 8 is a side surface view and a bottom surface view illustrating an example of a layout (arrangement) of an optical unit and an illumination light source in a housing of a lighting device according to the present invention;

FIG. 9 is a side surface view and a bottom surface view illustrating an example of a layout (arrangement) of an optical unit and an illumination light source in a housing of a lighting device according to the present invention;

FIG. 13 is a diagram showing an example of message modes (timer setting condition and the like) of the messages of the above message board function;

FIG. 14 is a flowchart showing an operation method of a modification example of the message board function by the above projection-type video-image display unit;

Figure 15:
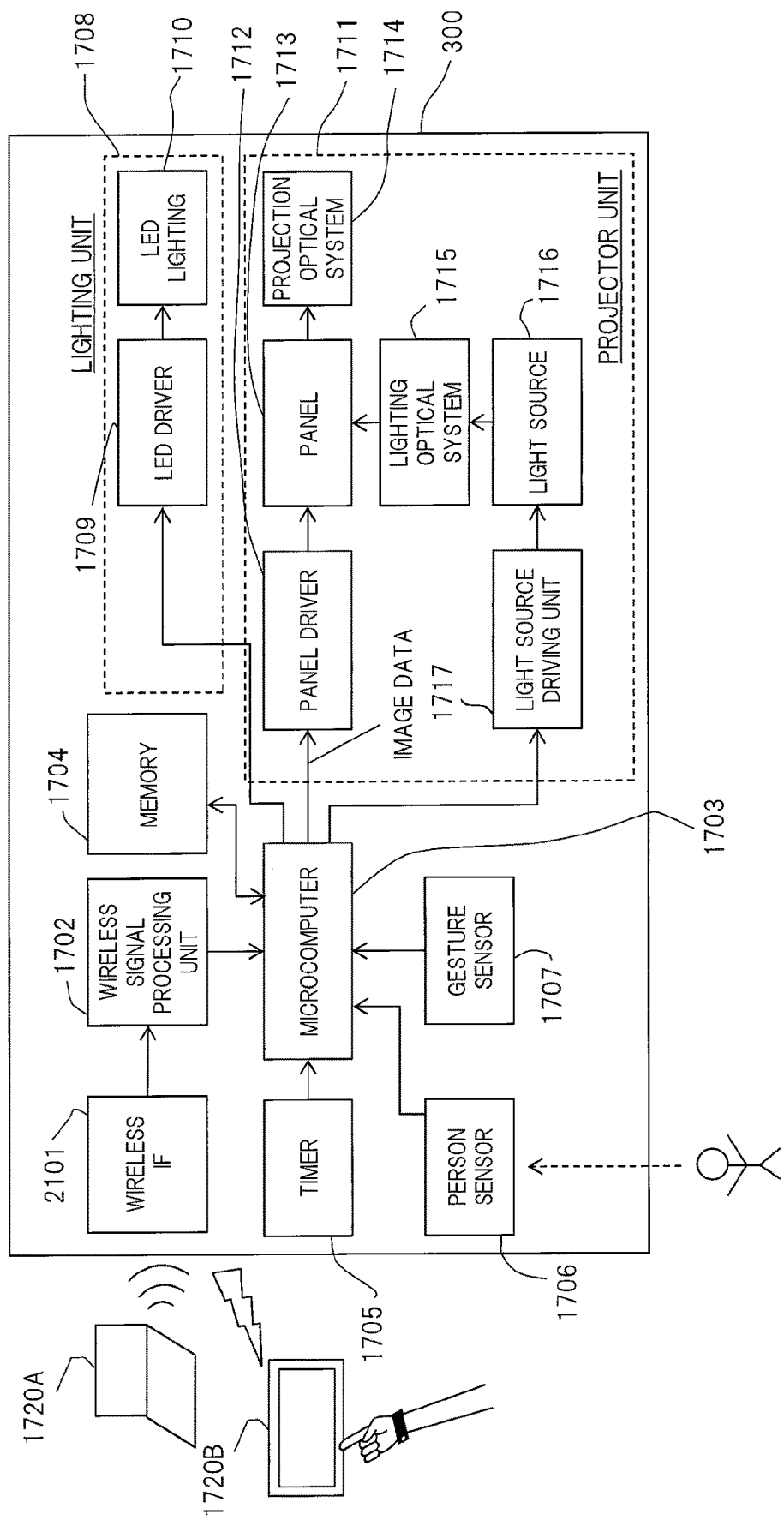
Figure 16:
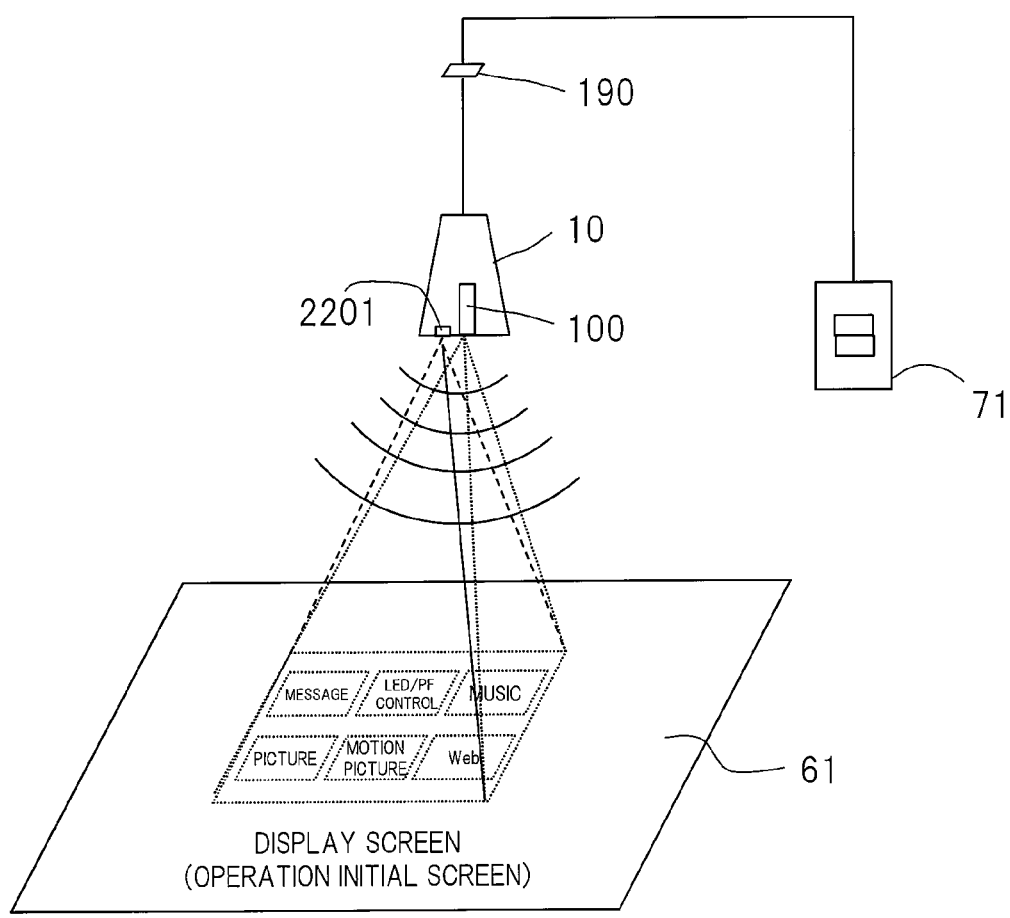
Figure 17:
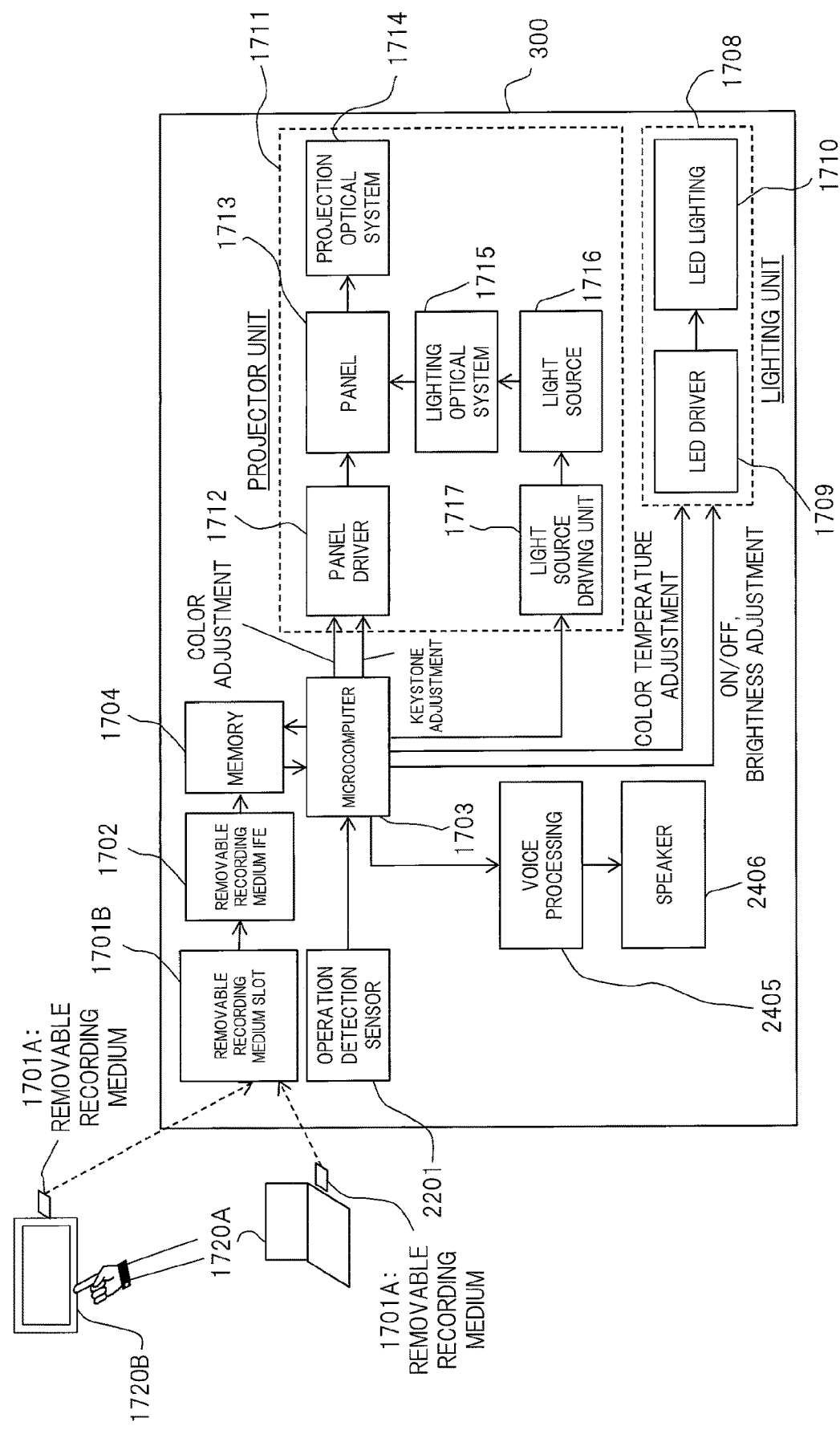
Figure 18:
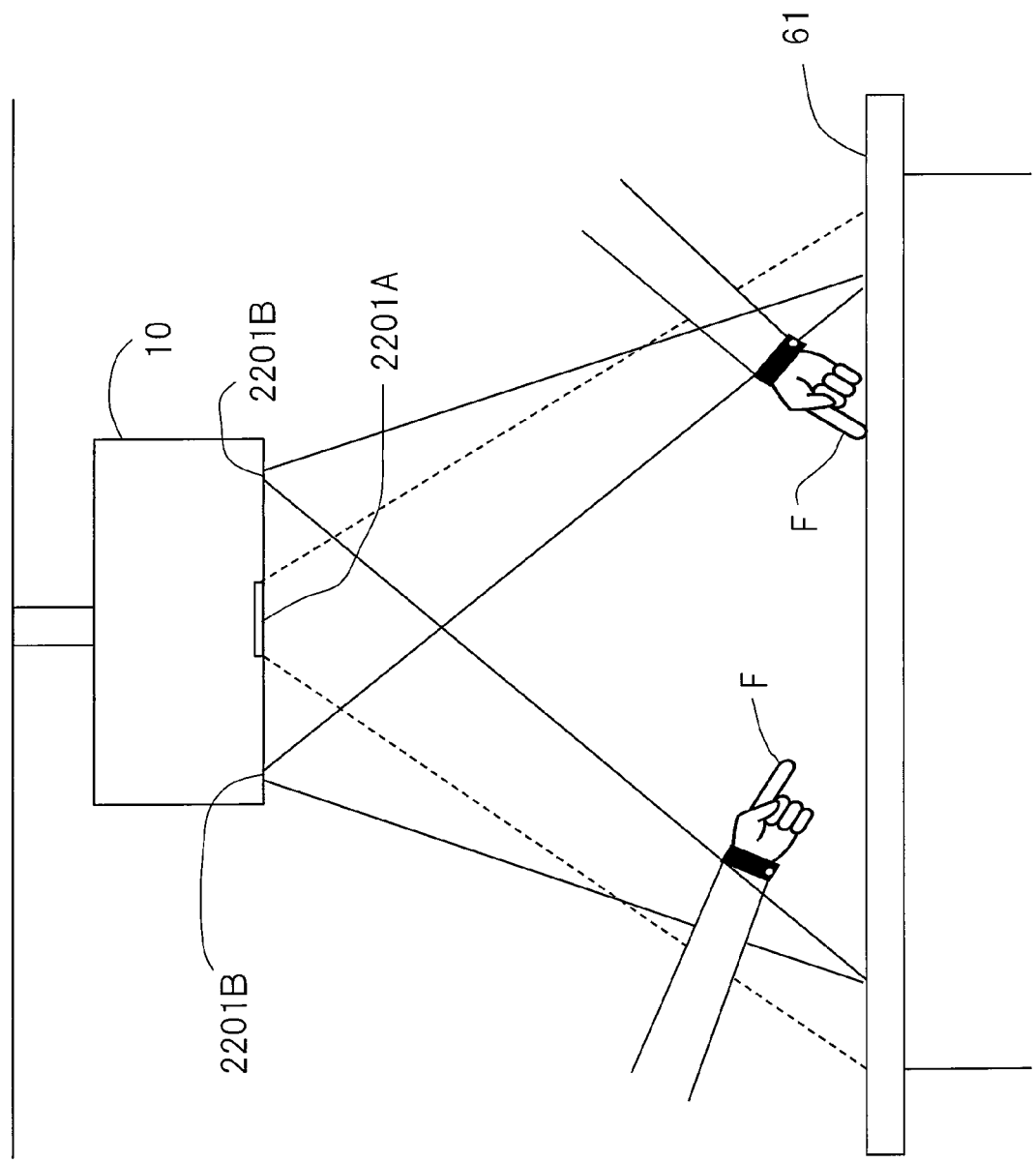
Figure 19:
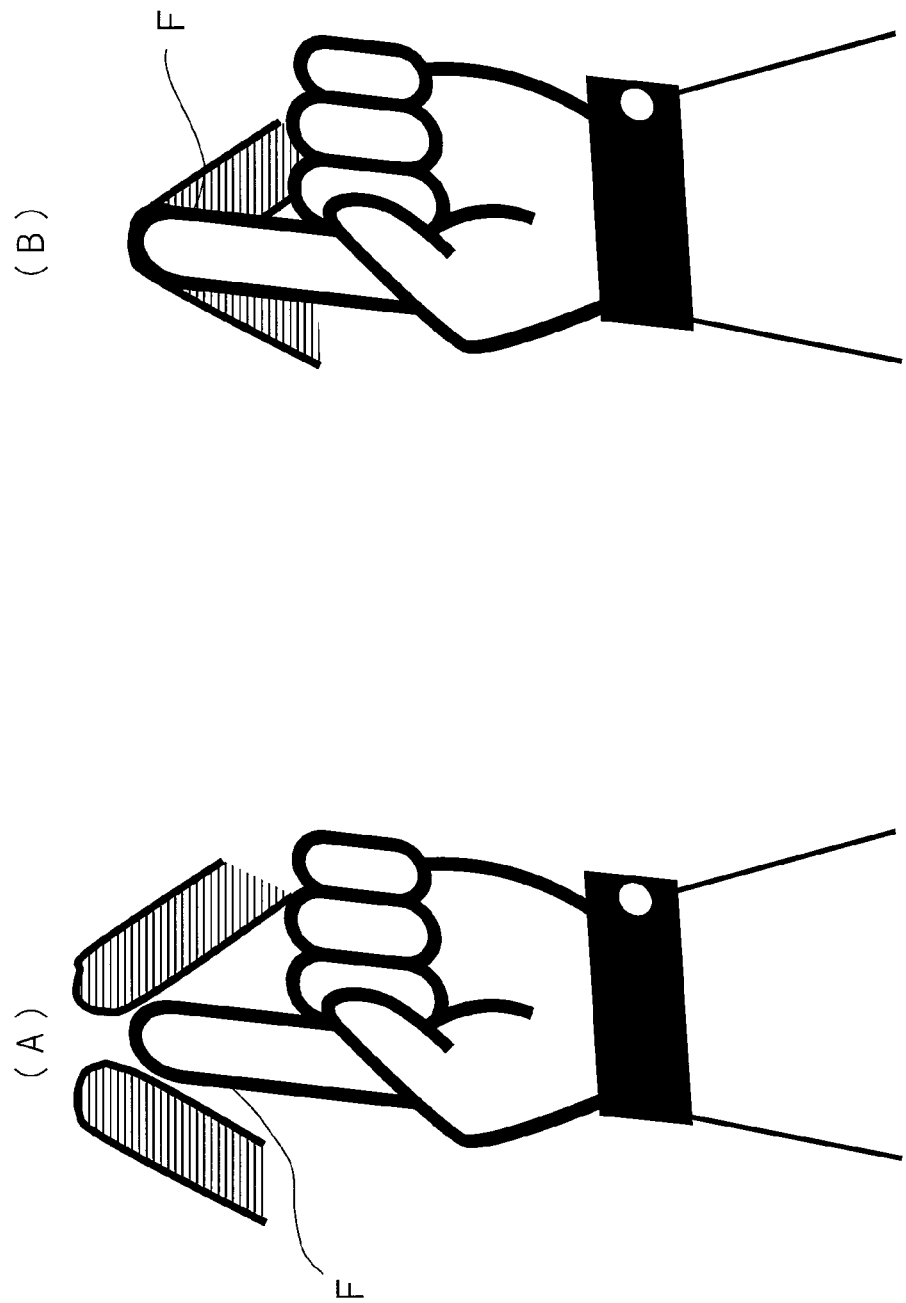
Figure 20:
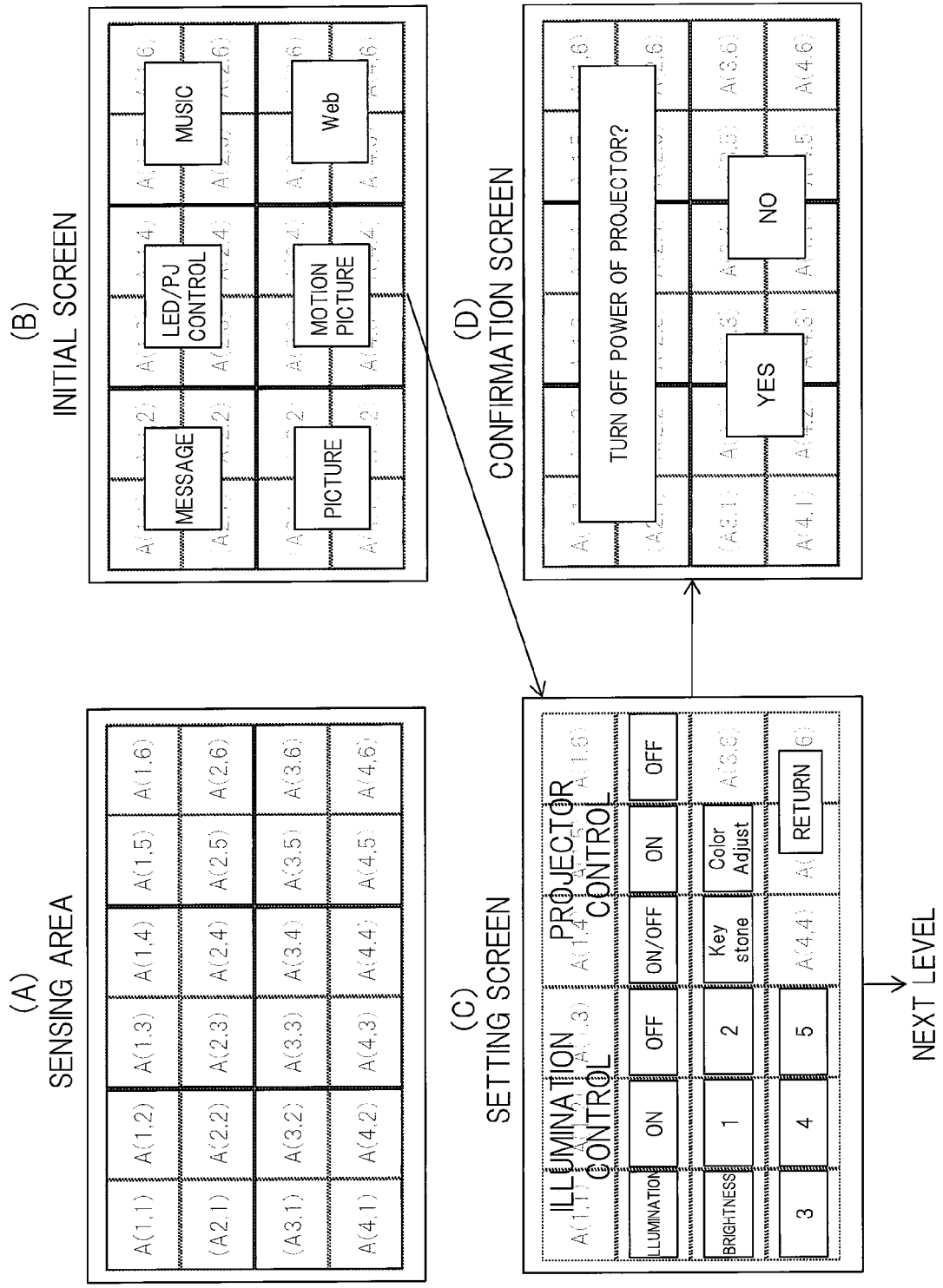
Figure 21:
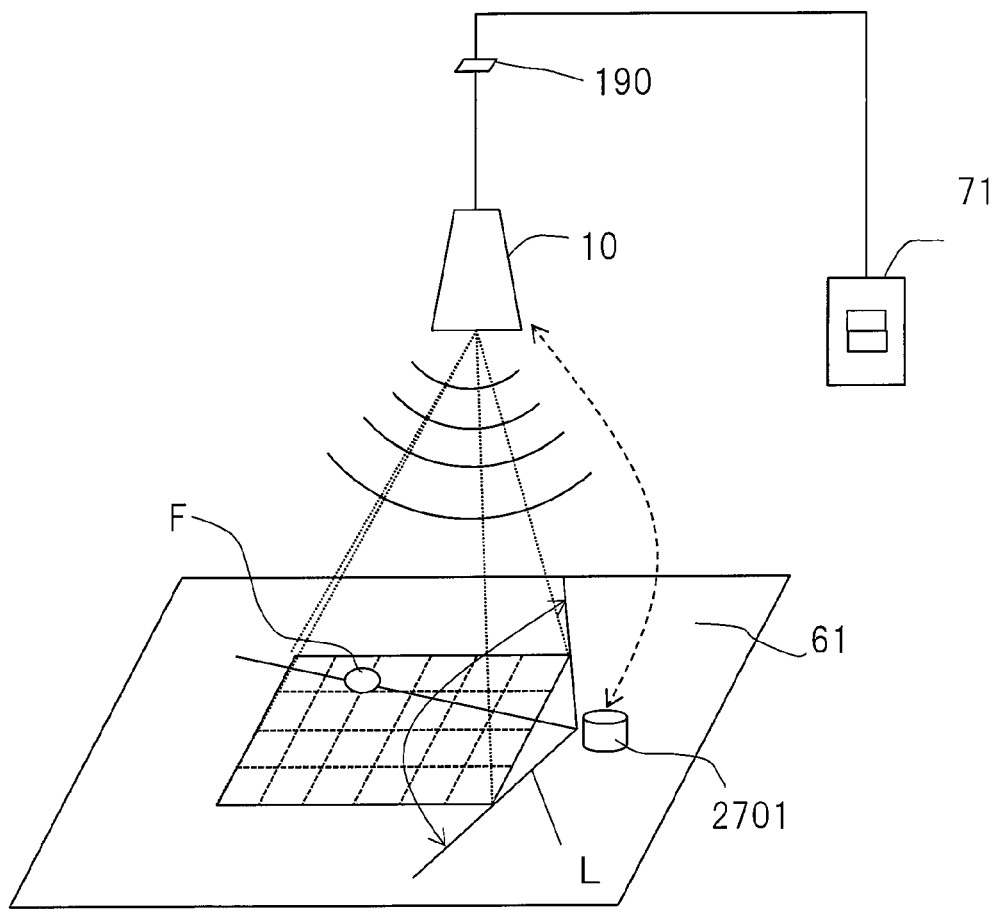
Figure 22:
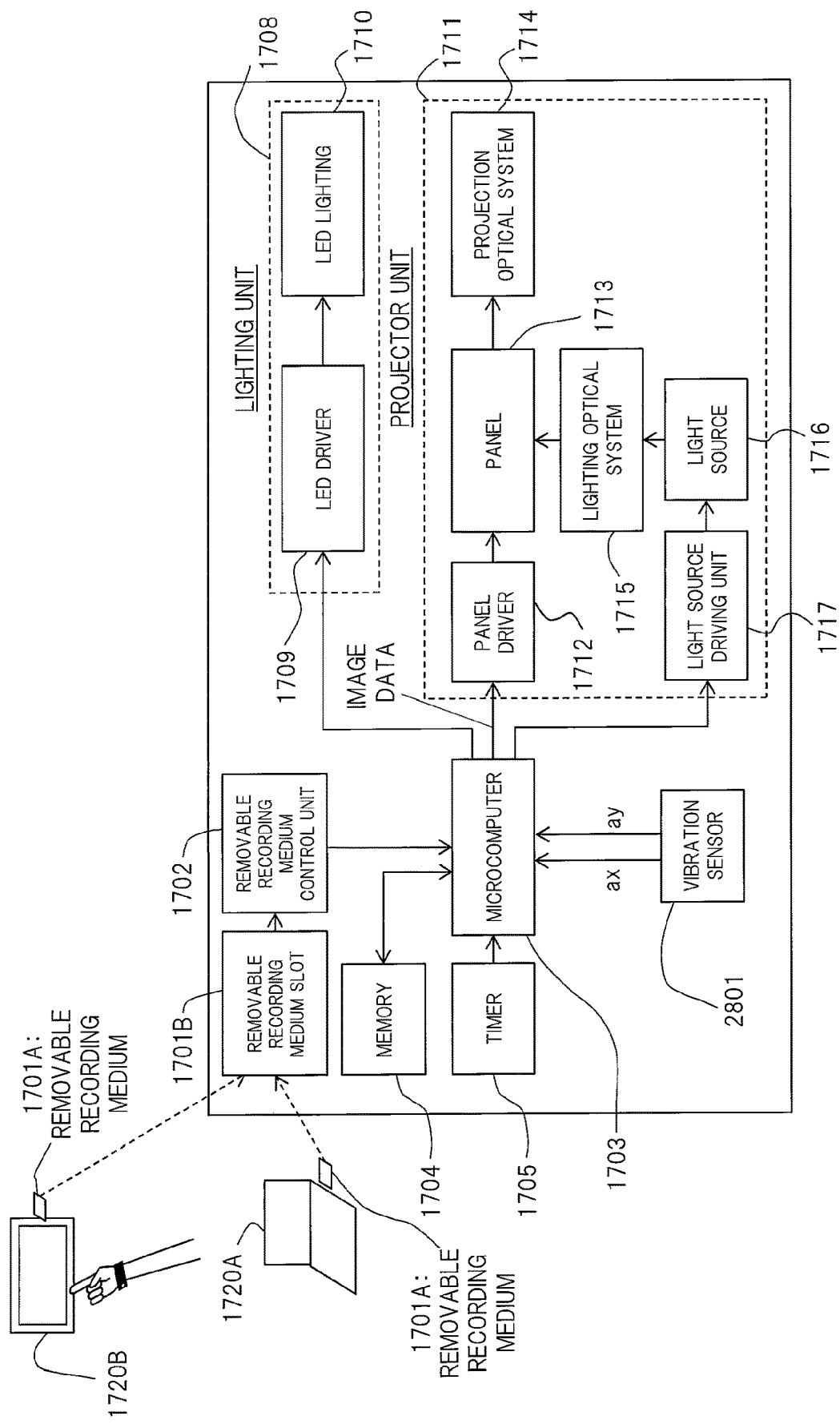
Figure 23:
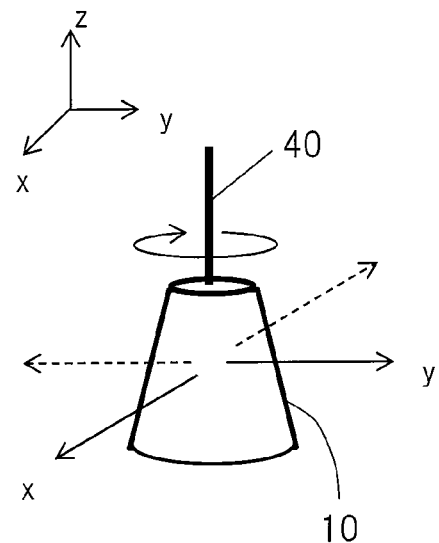
Figure 24:
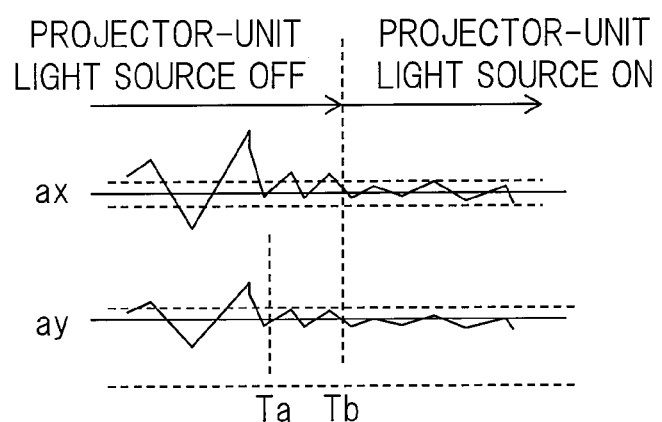
Figure 25:
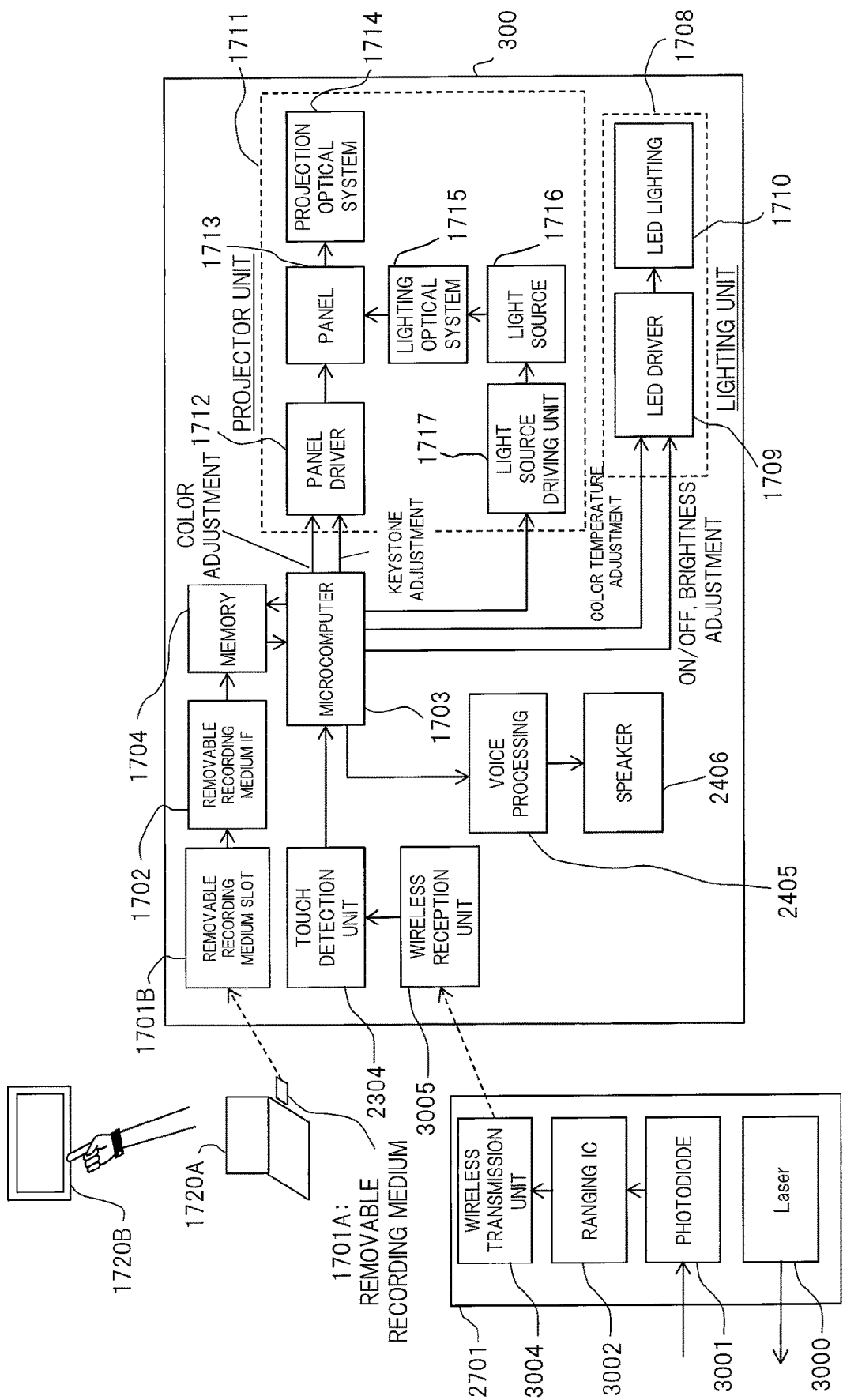

FIG. 15 a block diagram showing a configuration for realizing a modification example of the message board function by the above projection-type video-image display unit;

FIG. 16 is a diagram showing the overall configuration of a video-image projection function-equipped lighting device having an interactive function of the present invention;

FIG. 17 is a block diagram showing a configuration for realizing an interactive function in the video-image projection function-equipped lighting device;

FIG. 18 is an explanatory diagram of the principle of detecting contact (touch operation) of a user's finger onto a display surface by an operation detection sensor;

FIG. 19 is an explanatory diagram of the principle of detecting contact (touch operation) of a user's finger onto a display surface by an operation detection sensor;

FIG. 20 is a diagram showing an example of transition to a screen projected on the display surface by the above interactive function;

FIG. 21 is a diagram showing the overall configuration of a lighting device of another example (TOF sensor) that realizes the above interactive function;

FIG. 22 is a block diagram showing a configuration using a vibration sensor in the above video-image projection function-equipped lighting device;

FIG. 23 is a diagram showing the overall configuration of a video-image projection function-equipped lighting device using the above vibration sensor;

FIG. 24 is a waveform chart showing operations of the video-image projection function-equipped lighting device using the above vibration sensor; and FIG. 25 is a block diagram showing the overall configuration of a lighting device as an example for realizing the interactive function by a TOF sensor.

DETAILED DESCRIPTION OF PREFERRED EMBODIMENTS

Hereinafter, embodiments of the present invention will be described in detail with reference to the accompanying drawings.

<Pendant-Type and Ceiling-Type Video-Image Projection Function-Equipped Lighting Device>

Figure 1:
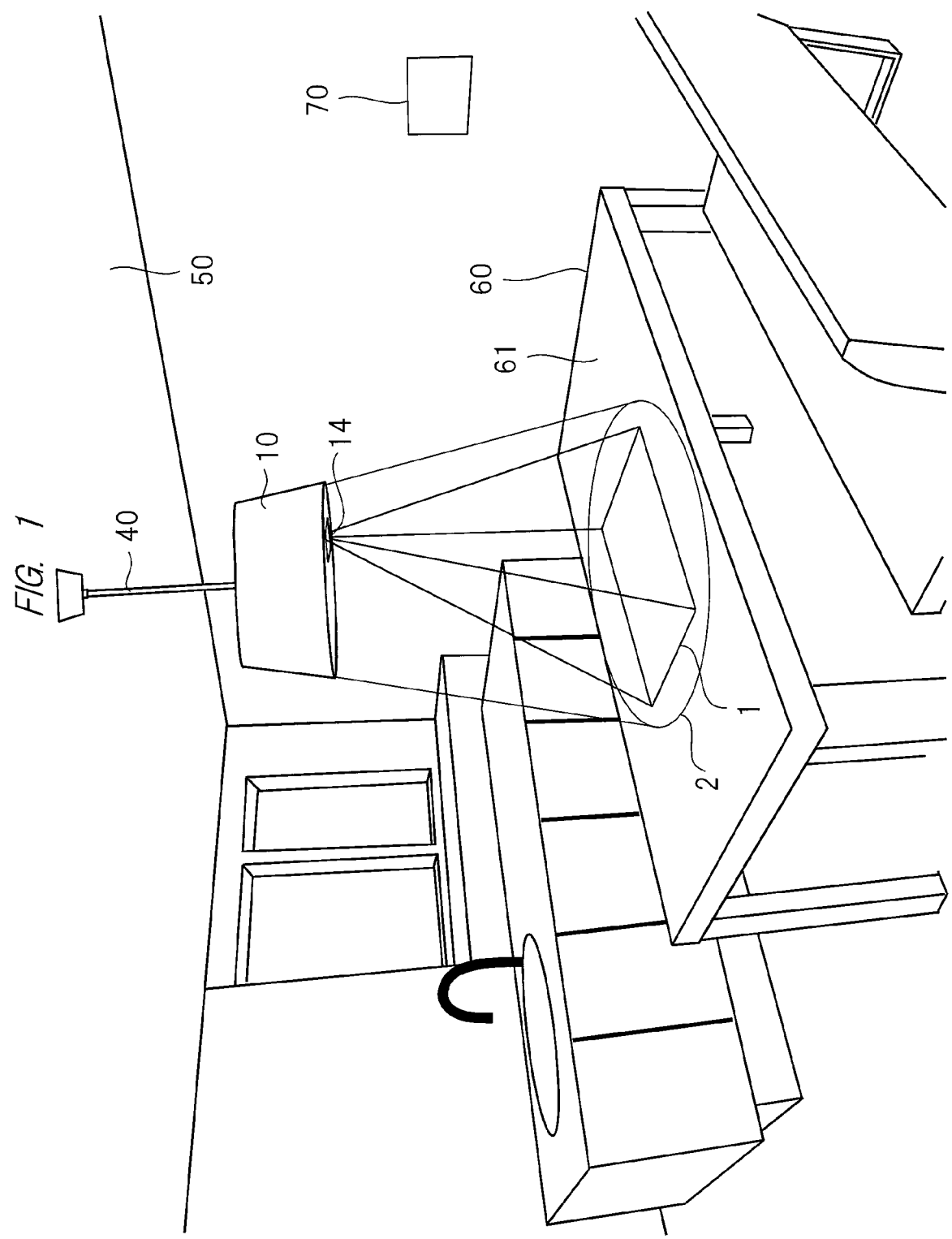
FIG. 1 is a perspective view showing an external appearance configuration of a pendant-type lighting device, which is an embodiment of the present invention, together with its use environment.
Figure 2:
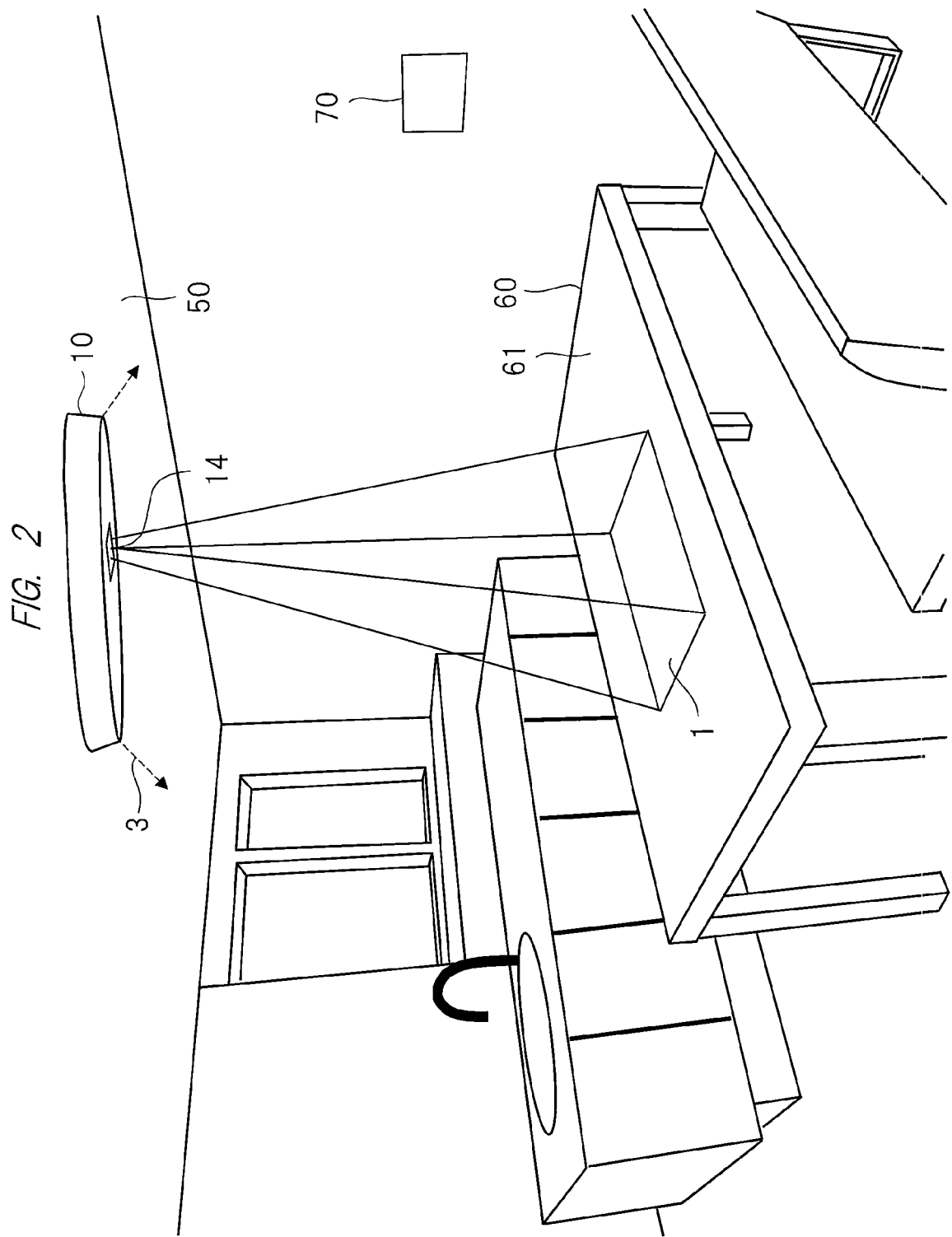
FIG. 2 is a perspective view showing an external appearance configuration of a ceiling-type lighting device, which is an embodiment of the present invention, together with its use environment.

First of all, FIG. 1 and FIG. 2 each show an external appearance configuration of a video-image projection function-equipped lighting device which is an embodiment of the present invention. FIG. 1 shows a video-image projection function-equipped lighting device in which a video-image projection function is mounted on a so-called pendant-type lighting device and that is attached in such a form as to be suspended from a ceiling surface. FIG. 2 shows a video-image projection function-equipped lighting device in which a video-image projection function is mounted on a so-called ceiling-type lighting device and that is attached to the ceiling surface.

As is apparent from these drawings, these video-image projection function-equipped lighting devices 10 are used by being attached to, for example, a wall surface constituting a space such as a kitchen, a dining room, a living room, or an office; a ceiling surface 50; or the like. More specifically, as shown also in the figure, the video-image projection function-equipped lighting device 10 is installed integrally at a predetermined height or ceiling surface above a table or a desk 60 installed in the room. The video-image projection function-equipped lighting device 10 is a lighting device that has both of: a lighting function of illuminating an upper surface, a wall surface, or the like of the table or desk with illumination light 2; and a video-image projection function of projecting and displaying various video images 1 to the upper surface (display surface or projection surface) 61 of the table or desk 60. It should be noted that the reference symbol "40" in FIG. 1 denotes, particularly, a holding tool for holding the pendant-type lighting device 10 suspended from the ceiling surface at the desired position. An opening portion or a transparent window 14 will be described later.

A horizontal surface table, a desk, or the like on which a video image(s) is desired to be projected with the video-image projection function is likely to be a target which is lighted by the lighting function, for example, when the video-image projection function-equipped lighting device 10 is used without using the video-image projection function. Therefore, a region on which the video image 1 is projected with the video-image projection function and a lighting range of the illumination light 2 of the lighting function desirably overlap each other at least partially.

The video-image projection function-equipped lighting device preferably mounts various control units described later, so that the video-image projection function-equipped lighting device is preferably configured to be able to individually turn ON/OFF the illumination light of the lighting function and the video image projected by the video-image projection function.

Alternatively, an operation signal may be transmitted via wires or wirelessly to the various control units of the video-image projection function-equipped lighting device from an operation panel 70 (wall surface operation input unit) attached to the wall and the like to control each ON/OFF state of: the illumination light of the lighting function; and the video image projected by the video-image projection function.

Figure 3:
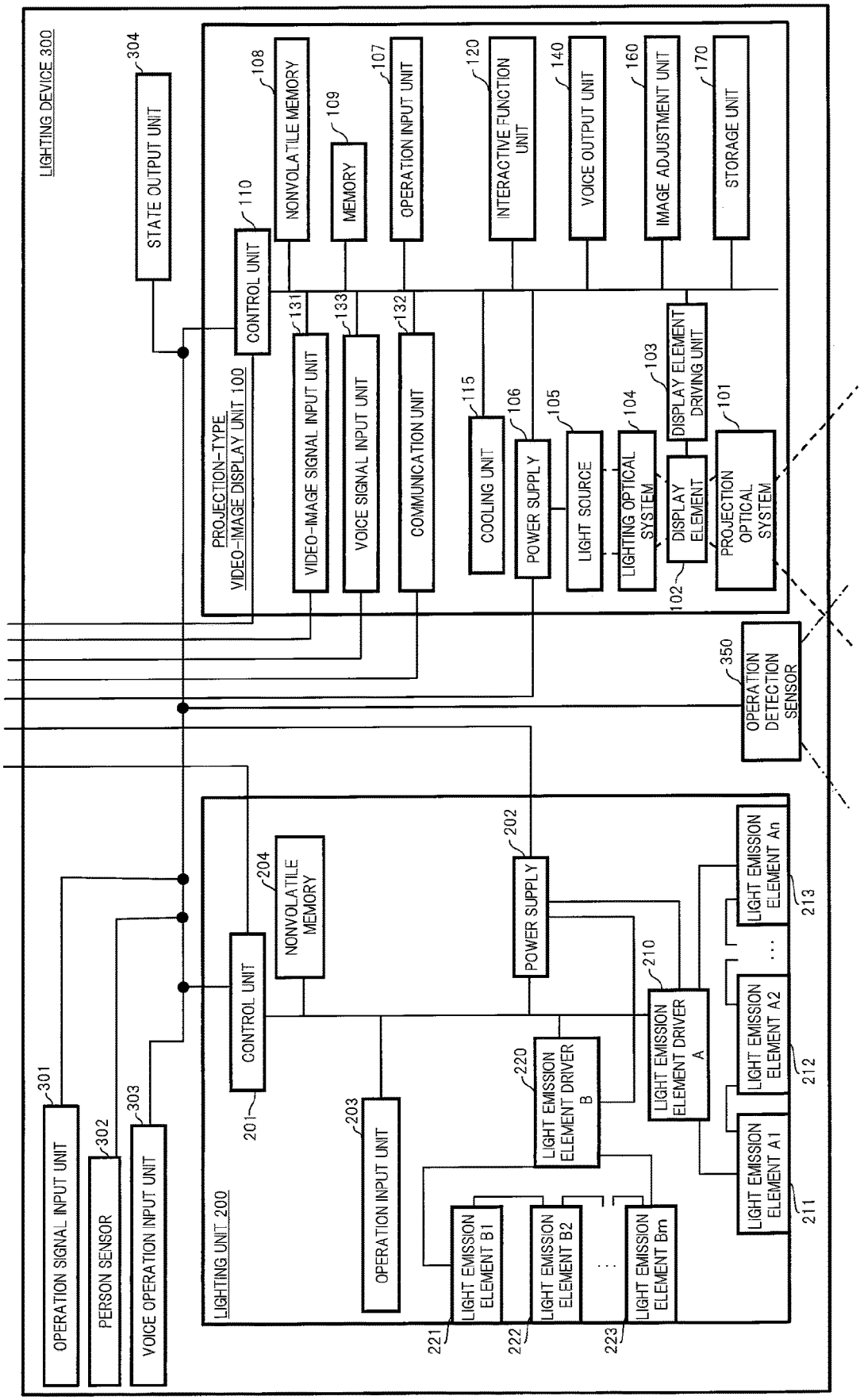
FIG. 3 is a block diagram showing an example of an internal configuration of a lighting device according to the present invention.

FIG. 3 is a block diagram showing an example of an internal configuration of a video-image projection function-equipped lighting device 300. The video-image projection function-equipped lighting device 300 includes a projection-type video-image display unit 100 having a video-image projection function and a lighting unit 200 having an illumination light emission function.

An operation signal input unit 301 is an operation button or a reception unit of a remote controller, and inputs an operation signal from a user. A person sensor 302 is a sensor using infrared rays, ultrasonic waves, visible light, or the like to determine presence or absence of a person (s) in the vicinity of the video-image projection function-equipped lighting device 300 or in a room on which the video-image projection function-equipped lighting device 300 is installed. The person sensor 302 itself may use a person sensor of the existing technique unless otherwise noted in the following description. A voice operation input unit 303 collects voice around the video-image projection function-equipped lighting device 300, performs a voice recognition processing, and converts a result(s) of the voice recognition processing into an operation signal. The operation signal generated by the voice operation input unit 303 is used for an operation of each unit of the video-image projection function-equipped lighting device 300.

An operation detection sensor 350 is a camera that shoots a range including a video-image projection region on a display surface 61, and can detect reflection light from an operation object by detecting invisible light such as an infrared light component. Incidentally, by setting cut wavelength of an optical filter of the operation detection sensor 350 to a visible light wavelength range (for example, setting the cut wavelength to the middle of a red visible light region), some of visible light components (i.e., projection video images onto a display screen) other than infrared light can be captured together with an infrared light component(s). An input from the operation detection sensor 350 is used for a determination processing etc. of a gesture operation(s) by a user's hand in the vicinity of the video-image projection region, and the like.

A state output unit 304 outputs or displays: (1) an illumination state such as an ON/OFF state of illumination light of a lighting unit 200; (2) a standby state in which the illumination light of the lighting unit 200 is not emitted and the lighting unit 200 itself is operating; (3) an error state of the lighting unit 200; (4) a lighting state such as the ON/OFF state of the light source of the projection-type video-image display unit 100; (5) a standby state in which the light source of the projection-type video-image display unit 100 is not emitted and the projection-type video-image display unit 100 itself is operating; (6) an error state of the projection-type video-image display unit 100; (7) an operation state (in operation or not) of the person sensor 302; (8) an operation state (in operation or not) of the voice operation input unit 303; (9) an operation state (in operation or not) of the operation detection sensor 350; and the like.

The state output unit 304 may be configured to indicate these plural types of states by changing each color, light emission cycle, or the like of a plurality of LED indicators. In addition, the state output unit 304 may be configured to display these plural kinds of states with characters, marks, and the like by using liquid crystal monitors, organic EL monitors, monitors of other methods, and the like.

The operation signal input unit 301, the person sensor 302, the voice operation input unit 303, the operation detection sensor 350, the state output unit 304, and the like described above may be configured to transmit and receive information to and from the control unit of the projection-type video-image display unit 100 and the control unit of the lighting unit 200. Therefore, the inputs of the operation signal input unit 301, the person sensor 302, the voice operation input unit 303, the operation detection sensor 350, and the like can be used for processings by both of the projection-type video-image display unit 100 and the lighting unit 200. The state output unit 304 can collectively indicate the states of both of the projection-type video-image display unit 100 and the lighting unit 200 by the same LED indicators and monitors.

Next, a configuration of the projection-type video-image display unit 100 will be described. A projection optical system 101 is an optical system that projects a video image(s) onto the display surface 61, and includes lenses and/or mirrors. A display element 102 is an element that modulates transmitted light or reflected light and generates a video image(s). For example, the display element 102 may be a transmissive liquid crystal panel, a reflective liquid crystal panel, a DMD (Digital Micromirror Device: registered trademark) panel, or the like. A display element driving unit 103 transmits, to the display element 102, a driving signal corresponding to the video-image signal.

A light source 105 generates light for video-image projection. Used as the light source 105 may be a high-pressure mercury lamp, a xenon lamp, an LED light source, a laser light source, or the like. A power supply 106 converts an externally input AC current into a DC current and supplies power to the light source 105. In addition, the power supply 106 supplies a necessary DC current (s) to each of the other units.

A lighting optical system 104 collects the light generated by the light source 105, and makes the collected light more uniformly to illuminate the display element 102 therewith. A cooling unit 115 cools each unit, which comes to a high temperature state, by an air cooling system or a liquid cooling system as necessary, such each unit being, for example, the light source 105, the power supply 106, or the display element 102. An operation signal input unit 107 is an operation button and/or a reception unit of a remote controller. The operation signal input unit 107 inputs an operation signal from the user. The operation signal input unit 107 may receive an infrared signal or a radio signal from the operation panel 70 of FIG. 1. When a signal from the operation signal input unit 301 in the lighting device 300 is inputted to the projection-type video-image display unit 100, the projection-type video-image unit may have no structure of the operation signal input unit 107.

A video-image signal input unit 131 is connected to an external video-image output device to input video-image data. A voice signal input unit 133 is connected to an external voice output device to input voice data. A voice output unit 140 can perform a voice output(s) based on the voice data inputted to the voice signal input unit 133. The voice output unit 140 may output a built-in operation sound (s) or an error warning sound (s). For example, a communication unit 132 is connected to an external information processing device to input and output various control signals. The communication unit 132 may perform wired or wireless communication with the operation panel 70 of FIG. 1.

A nonvolatile memory 108 stores various data used in the projector function. The data stored in the nonvolatile memory 108 includes: data and display icons for various operations in an interactive function described later; data for calibration described later; and the like. The memory 109 stores projection video-image data and/or device control data, etc. A control unit 110 controls an operation of each unit to be connected. Further, the control unit 110 inputs and outputs information to and from the operation signal input unit 301, the person sensor 302, the voice operation input unit 303, the operation detection sensor 350, and the like, and the control unit 110 may control those.

An interactive function unit 120 is a unit that performs an interactive operation such as writing of a character(s) or a figure(s) to a video-image region by a user operating a light emission pen or a finger(s). Thus, the interactive function unit 120 has: a function of analyzing an infrared image(s) acquired from the operation detection sensor 350 and calculating a position(s) (a position(s) operated by the user) of the light emission pen or/and the finger. The interactive function unit 120 also has a function of executing applications operable by a light emission pen or a finger such as an application that combines operation icons during the projection video image, an application that performs a drawing processing etc. based on the user's operation, an application that performs an operation on the video image(s) etc. inputted from an external video-image output device, and the like.

Here, a photographing range of the operation detection sensor 350 and a range of the video image (an optical image(s) on the display surface 61 in the video-image region of the display element 102) projected on the display surface 61 are never matched with each other. Therefore, on calculating the position that the user has operated (drawn), it is necessary to convert coordinates in the photographing range of the operation detection sensor 350 and a coordinate position in the video image projected on the display surface 61. The interactive function unit 120 thus has a function of: a processing of the conversion; and a processing for creating conversion table data (calibration data) for the conversion processing; and the like.

An image adjustment unit 160 performs an image processing to the video-image data inputted by the video-image signal input unit 131. Examples of such an image processing include: a scaling processing for enlarging, reducing, transforming, and the like of the image; a brightness adjustment processing for changing brightness; a contrast adjustment processing for changing contrast curve of the image; a retinex processing for decomposing the image into components of light and changing weighting for each component; and the like.

A storage unit 170 records a video image(s), an image(s), voice, various kinds of data, and the like. For example, the storage unit 170 may record the video image, image, voice, various kinds of data, and the like at the time of product shipment. The storage unit 170 may also record the video image, image, voice, various kinds of data, and the like acquired from an external device, an external server, or the like via the communication unit 132. The video image, image, various kinds of data and the like recorded in the storage unit 170 may be outputted as a projection video image(s) via the display element 102 and the projection optical system 101. The voice recorded in the storage unit 170 may be outputted as voice from the voice output unit 140.

As described above, it is possible to install various functions on the projection-type video-image display unit 100. However, the projection-type video-image display unit 100 does not necessarily have all of the above-described configurations. Any structure can be used as long as the function that projects the video image is provided.

Subsequently, a configuration of the lighting unit 200 will be described.

A control unit 201 controls each unit to be connected. Further, the control unit 201 may input and output information to and from the operation signal input unit 301, the person sensor 302, the voice operation input unit 303, the operation detection sensor 350, and the like. The control unit 201 may also control those. An operation signal input unit 203 is an operation button and a reception unit of a remote controller, and inputs an operation signal(s) from the user. The operation signal input unit 203 may receive an infrared signal and a radio signal from the operation panel 70 of FIG. 1. When a signal(s) from the operation signal input unit 301 in the lighting device 300 is inputted to the lighting unit 200, the lighting unit 200 may have no structure of the operation signal input unit 203. A nonvolatile memory 204 stores various kinds of data used in the lighting unit 200.

A power supply 202 converts an externally input AC current into a DC current and supplies power to light emission element drivers (210, 220, etc.). Further, the power supply 202 supplies a necessary DC current(s) to each of the other units. The light emission element drivers (210, 220, etc.) use power supplied from the power supply 202, and controls the light emission elements (211, 212, 213, 221, 222, 223, etc.) to emit light based on the control of the control unit 201. The light emission element serves as a light source of illumination light emitted by the lighting unit 200.

For example, in an example of FIG. 3, a light emission element driver A 210 collectively drives n light emission elements A1, A2, . . . , An (211, 212, 213, etc.) connected in series. Based on the control of the control unit 201, the light emission element driver A 210 changes brightness and color, etc. of these light emission elements. Likewise, a light emission element driver B 220 collectively drives m light emission elements B1, B2, . . . , Bm (221, 222, 223, etc.) connected in series. Based on the control of the control unit 201, the light emission element driver B 220 changes brightness and color, etc. of these light emission elements. With this configuration, it is possible to control changes of luminance and color of a plurality of light emission elements for each light emission element driver. The example of FIG. 3 has two sets, each including a light emission element driver and a plurality of sets of light emission elements, but may have one set or three or more sets. The number of sets may be increased or decreased as necessary.

According to the configuration described above, the lighting unit 200 can emit illumination light whose brightness and/or color are variable.

A specific layout (arrangement) of the optical unit 30 and the lighting light source in the video-image projection function-equipped lighting device will be described below with reference to FIG. 4 to FIG. 9. Incidentally, a plurality of semiconductor light emission elements (LEDs) 22 in FIG. 4 to FIG. 9 correspond to the light emission elements (211, 212, 213, 221, 222, 223, etc.) of FIG. 3. The entire illumination light source, which includes a group of the plurality of semiconductor light emission elements (LEDs) 22, is described as an illumination light source 20.

Incidentally, dotted lines in side surface views in FIG. 4 to FIG. 9 show a diffusion range of an illumination light beam of the lighting unit 200. A triangle extending from the optical unit 30 shows, from a side surface, an emission region of a video image(s) projected from the optical unit 30 of the projection-type video-image display unit 100.

Incidentally, each of FIG. 4 to FIG. 9 also shows an example of attaching a string-type toggle switch. In each figure, a string portion 90 (which may be composed of fibers, metal chains, synthetic resin chains, etc.) of the string-type toggle switch and its tip portion 91 are shown. When the string-type toggle switch is installed, as shown in each figure, the tip portion 91 is preferably arranged so as to be within the diffusion range of the illumination light of the lighting unit 200 and be outside the emission range of the projection video image from the optical unit 30 of the projection-type video-image display unit 100. When the string-type toggle switch is attached in a downward direction of a housing (shade) 11, the video-image projection function-equipped lighting device is miniaturized in size, so that the string portion 90 and the tip portion 91 of the string-type toggle switch are arranged within the diffusion range of the illumination light of the lighting unit 200.

At this time, as shown in FIG. 4 to FIG. 9, when the plurality of semiconductor light emission elements are used as the light source of the illumination light of the lighting unit 200, light from multiple directions is illuminated to the string portion 90 and the tip portion 91 of the string-type toggle switch. Shadows made by the string portion 90 and the tip portion 91 of the string-type toggle switch against the light source of the illumination light of the lighting unit 200 are thinned by rays of multiple different emission angles and become inconspicuous. Therefore, the shadows are less likely to cause a problem(s) on quality. On the other hand, light of a projection video image(s) from the optical unit 30 is emitted from an exit of the optical unit 30. Therefore, if the string portion 90 and the tip portion 91 of the string-type toggle switch are in the emission region of the projection video image from the optical unit 30, portions of the shadows made by the string portion 90 and the tip portion 91 of the string-type toggle switch with respect to the projection video image are lost from the video image, which make quality of the lighting unit 200 very deteriorative.

Therefore, when the string-type toggle switch is installed on the video-image projection function-equipped lighting device, as shown in each figure, the tip portion 91 is preferably arranged so as to be within the diffusion range of the illumination light of the lighting unit 200 and be outside the emission range of the projection video image from the optical unit 30 of the projection-type video-image display unit 100.

<Pendant-Type Video-Image Projection Function-Equipped Lighting Device>

First, FIGS. 4(A) and 4(B) are a side-surface section and a bottom surface view illustrating a pendant-type video-image projection function-equipped lighting device 10. In this example, the optical unit 30 is arranged in a vertical layout. A substrate 21 of an illumination light source 20 having a plurality of semiconductor light emission elements (LEDs) 22 is attached to an inner bottom surface of a housing (shade) 11 which is a main body. Further, a diffusion plate 12 is attached to an aperture surface on a lower side of the figure so as to cover it.

In a space formed by the housing (shade) 11 and the diffusion plate 12, the optical unit 30 is arranged so as to be positioned substantially at a center of illumination luminous flux. In an example of FIG. 4, an opening portion or a transparent window 14 is provided at a position of the diffusion plate 12 through which projection light is emitted downward from the optical unit 30. This reason is as follows. If the opening portion or transparent window is not provided and the entire surface of the diffusion plate 12 has a diffusion effect, even the projection video image emitted from the optical unit 30 is spread, which makes it impossible for the video image to form an image(s) on a video-image projection target surface such as a table or a desk.

A portion of the opening portion or transparent window 14 may be a cut-away opening of the diffusion plate 12 or a transparent substance such as glass having no diffusion effect. When the transparent window is formed of a transparent substance or the like, a configuration in which dust hardly enters the diffusion plate 12 can be adopted. However, in order to minimize an adverse influence on the projection video image emitted from the optical unit 30 as much as possible, a coating having as flat a spectral characteristic as possible should be subjected to the transparent window in a wavelength range of the projected light emitted from the optical unit 30.

Incidentally, a periphery of the opening portion or the transparent window 14 is not necessarily directly connected to the diffusion plate 12. A region such as a decorative plate may be provided between the opening portion or the transparent window 14 and the diffusion plate 12 so as to make the shadow of the optical unit 30 on the diffusion plate 12 less visible. That is, the opening portion or the transparent window 14 is a passage or a transparent port necessary for emitting the video-image projection light projected from the optical unit 30 arranged in the space formed by the housing (shade) 11 and the diffusion plate 12. Its position may be in the diffusion plate 12 or a part of another structure object.

According to such a layout (arrangement), the optical unit 30 can be made thin in a direction parallel to a horizontal surface. Therefore, a ratio of the shadow formed by the optical unit 30 can be reduced in the lighting area of the illumination light source 20 to the diffusion plate 12. As a result, it is possible to suppress deterioration of apparent quality as the lighting device (that is, a sense of discomfort as the lighting device due to the shadow on the diffusion plate 12) due to the influence of the shadow of the optical unit 30 formed on the diffusion plate 12. When the above housing (shade) 11 is formed by a diffusion plate, the shadow of the optical unit 30 is inconspicuous, so that deterioration of apparent quality as the lighting device can be suppressed.

In an example of FIGS. 5(A) and 5(B), the optical unit 30 is arranged in a horizontal layout. The optical unit 30 is arranged above the substrate 21 for the illumination light source 20. For example, the optical unit 30 may be attached to an upper surface of the substrate 21, or may be attached to the housing (shade) 11. By making the whole of the video-image projection function-equipped lighting device further thin in a vertical direction, the video-image projection function-equipped lighting device having a thinner structure can be realized. Incidentally, in a case of a modification example, an opening portion or a transparent window portion for transmitting the video-image light from the optical unit 30 is formed, with a size larger than the one described above, in the diffusion plate 12 attached so as to cover the opening under the illumination light source 20. An opening portion (or transparent window) 26 for transmitting the projection light from the optical unit 30 is formed at a part of the substrate 21, that is, at a position where the optical unit 30 is arranged.

According to such a configuration, it becomes possible to realize the video-image projection function-equipped lighting device having a thinner structure. In addition thereto, since the optical unit 30 is arranged on a backside of the substrate 21, shadows are not formed by shielding the illumination light from the illumination light source 20. Thus, it is possible to prevent the deterioration of the appearance quality as the lighting device (that is, a sense of discomfort as the lighting device due to the shadow on the diffusion plate 12).

At this time, by making a lower surface of the optical unit 30 substantially coincident with an upper surface of the substrate 21, the size of the opening portion (or transparent window) 26 in the substrate 21 can be made as small as possible. This makes it possible to arrange the plurality of semiconductor light emission elements (LEDs) 22 more efficiently on the substrate 21.

FIGS. 6(A) and 6(B) are a side-surface section and a bottom surface view illustrating a pendant-type video-image projection function-equipped lighting device 10. In this example, the optical unit 30 is arranged in a vertical layout. The optical unit 30 attached inside the housing (shade) 11 is arranged so as to be positioned at an end of illumination luminous flux.

According to this layout (arrangement), the optical unit 30 is arranged so as to be positioned at the end of the illumination luminous flux, and an optical axis of a projection optical system and a position of a center of a display element in the optical unit 30 are shifted relatively in a horizontal direction, so that a center of the projection video image is projected to be closer to a center of the illumination luminous flux of the illumination light source 20 with respect to an exit of the projection optical system of the projector.

Furthermore, according to the arrangement of FIG. 6, it is also possible to apply, to some other purpose, a so-called fixed-type projector normally arranged and used on a desk as it is. This is because the projector is mostly set by shifting the optical axis of the projection optical system and the position of the center of the display element in advance. Therefore, the video-image projection function-equipped lighting device in FIG. 6 has a structure suitable for cost reduction. This effect similarly occurs in other configuration examples in which the optical unit 30 is positioned at the end of the downward illumination luminous flux.

In a layout of FIGS. 6(A) and 6(B), the plurality of semiconductor light emission elements (LEDs) 22 are provided and arranged on both surfaces of the substrate 21 for the illumination light source 20. As a result, it is possible to emit the illumination light upward in addition to emitting the illumination light downward. According to such a configuration, the illumination light can be emitted also above the video-image projection function-equipped lighting device 10, and the upper side emission can emit the ceiling and the like, and so functions also as indirect lighting (ceiling side indirect lighting function). Incidentally, in this example, the diffusion plate 12 (upper diffusion plate) is attached so as to cover the aperture surface in the upper surface of the housing (shade) 11 in addition to the diffusion plate 12 (lower diffusion plate) covering the aperture surface in the lower surface of the housing (shade) 11.

Switching of emission combination modes of a plurality of emission light beams and projection video images can also be realized by adopting a configuration that has a lighting function having a plurality of emission directions different from each other and a video-image projection function. For example, control may be performed to switch: a mode for emitting only the projection video image in the downward direction; a mode for emitting the emission light downward and not projecting the video image; a mode for emitting the emission light upward and not projecting the video image; a mode for emitting the emission light upward and emitting the projection video image in the upward direction; and the like.

Incidentally, the optical unit 30 in FIG. 6 is arranged at the end of the illumination luminous flux of the illumination light emitted downward, but the optical unit 30 may be arranged in the middle etc. of the illumination luminous flux of the illumination light emitted downward.

In an example of FIGS. 7(A) and 7(B), the optical unit 30 is arranged in a horizontal layout. In addition, an end portion of the substrate 21 for the illumination light source 20 is extended in the vertical direction to form a cylindrical shape, and also extended in the horizontal direction to form a flange portion. The plurality of semiconductor light emission elements (LEDs) 22 are attached to both the upper and lower surfaces of the substrate 21, an outer circumferential surface of the cylindrical portion, and a lower surface of the flange portion. In this example as well, the optical unit 30 is arranged to be positioned substantially at the center of the illumination luminous flux emitted downward. It should be noted that the arrangement of the optical unit 30 does not have to be substantially in the middle of the illumination luminous flux of the illumination light emitted downward. The optical unit 30 may be arranged near an end side of the illumination luminous flux of the illumination light emitted downward, i.e., near a side surface of the cylinder.

In addition the diffusion plate 12 (lower diffusion plate) covering the lower surface of the housing (shade) 11, the diffusion plate 12 (upper-portion circumferential direction diffusion plate) is attached to cover the upper surface and a part (upper portion) of the outer circumference of the housing (shade) 11. According to such a configuration, in addition to the above-described effect, it is possible to impartially emit the illumination light therearound including the upper surface and a lateral side of the video-image projection function-equipped lighting device 10. Furthermore, the upper side emission can emit the illumination light to the ceiling and the like, and so functions also as indirect lighting (ceiling-side indirect lighting function+wide range lighting function).

Switching of the emission combination mode of the plurality of emission light beams and the projection video images can also be realized by adopting the configuration that has the lighting function having the plurality of emission directions different from each other and the video-image projection function. For example, control may be performed to switch: a mode for emitting only the projection video image in the downward direction; a mode for emitting the emission light downward and not projecting the video image; a mode for emitting the emission light laterally and not projecting the video image; a mode for emitting the emission light downward and laterally and not projecting the video image; a mode for emitting the emission light laterally and projecting the projection video image in the downward direction; emitting the emission light upward and not projecting the video image; a mode for emitting the emission light upward and projecting the projection video image in the downward direction; and the like.

<Ceiling-Type Video-Image Projection Function-Equipped Lighting Device>

First, FIGS. 8(A) and 8(B) are a side-surface section and a bottom surface view illustrating the ceiling-type video-image projection function-equipped lighting device 10. In this example, the optical unit 30 is arranged in a horizontal layout. In addition, a substrate 21 of the illumination light source 20 having the plurality of semiconductor light emission elements (LEDs) 22 is attached to the bottom surface inside the housing 11 which is a main body; on a side of the aperture surface located on a lower side of the figure, the diffusion plate 12 is attached so as to cover this; and the optical unit 30 is arranged therein so as to be positioned substantially in the center of the illumination luminous flux.

According to such a layout (arrangement), the whole of the video-image projection function-equipped lighting device is made thin in the vertical direction, so that the video-image projection function-equipped lighting device having a thin structure can be realized.

A generally-available ceiling-type lighting device without the video-image projection function is mostly constructed thinly and widely on a ceiling surface. Therefore, by realizing the thin structure as shown in FIGS. 8(A) and 8(B) also in the video-image projection function-equipped lighting device, it becomes easy to replace therewith the conventional ceiling-type lighting device, and product value can be enhanced.

Furthermore, in the example of the ceiling-type video-image projection function-equipped lighting device 10 shown in FIGS. 9(A) and 9(B), the optical unit 30 is arranged in a horizontal layout. The end of the substrate 21 for the illumination light source 20 is vertically extended to form a cylindrical shape; the plurality of semiconductor light emission elements (LEDs) 22 are attached to the bottom surface thereof; and the semiconductor light emission elements (LEDs) 22 are also attached to an outer peripheral surface of the cylindrical substrate 21. This makes it possible to emit the illumination light not only in the downward direction but also in the lateral direction.

Incidentally, the optical unit 30 in this example is arranged to be positioned substantially at the center of the illumination luminous flux emitted downward. It should be noted that the arrangement of the optical unit 30 does not have to be substantially in the middle of the illumination luminous flux of the illumination light emitted downward. The optical unit 30 may be arranged near an end side of the illumination luminous flux of the illumination light emitted downward, i.e., near the side surface of the cylinder. In addition to the diffusion plate 12 (lower diffusion plate) covering the aperture surface in the lower surface of the housing 11, the diffusion plate 12 (side diffusion plate) is also attached to an outer periphery of the housing 11. According to such a configuration, in addition to the effect of the horizontally arranged optical unit described above, the illumination light can be emitted also to a side of the video-image projection function-equipped lighting device 10 (a wide range lighting function).

According to such a layout (arrangement), as the video-image projection function-equipped lighting device, it becomes possible to realize a thin-type video-image projection function-equipped lighting device which is made thin in the vertical direction, and at the same time, and the illumination light can also be emitted to the lateral side of the video-image projection function-equipped lighting device 10 (a wide range lighting function).

Similarly to the example as shown in FIG. 6 or FIG. 7, the example of FIG. 9 has the lighting function having the plurality of emission directions different from each other, so that, as described in FIG. 6 or FIG. 7, switching control of a plurality of modes about the emission light in the plurality of emission directions of the lighting function and the projection video image of the video-image projection function may be performed.

<Message Board Function>

Subsequently, in the video-image projection function-equipped lighting device according to the present invention described above, a concrete example of a (message board) function of displaying information to the upper surface 61 of the desk 60 by the projection-type video-image display unit 100 (see FIG. 3), including its operation method, will be described below with reference to FIG. 10 to FIG. 13.

Figure 10:
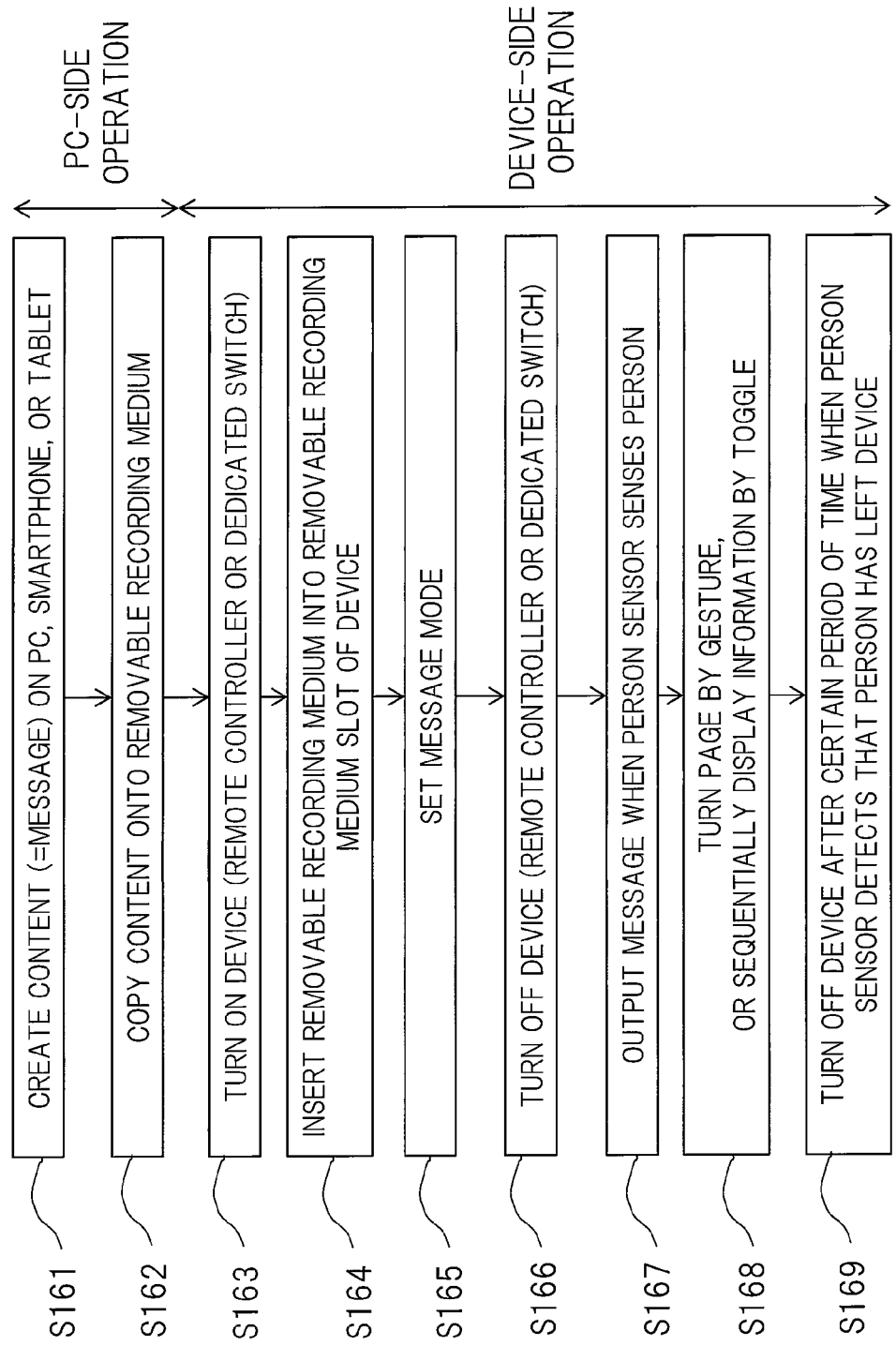
FIG. 10 is a flowchart showing an operation method of a message board function by the projection-type video-image display unit in a video-image projection function-equipped lighting device of the present invention.
Figure 11:
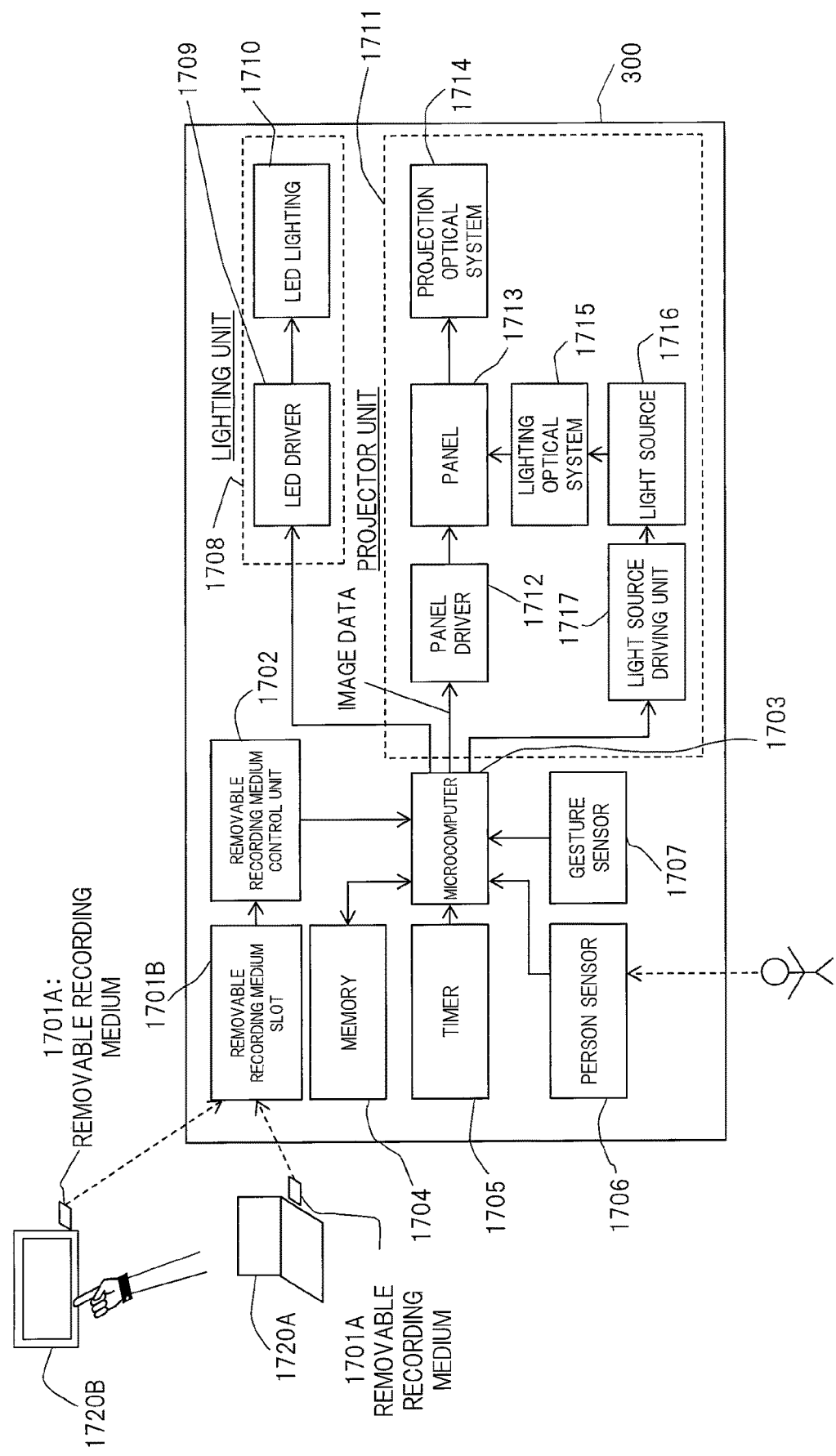
FIG. 11 is a block diagram showing a configuration for realizing a message board function by the projection-type video-image display unit in a video-image projection function-equipped lighting device of the present invention.

FIG. 10 and FIG. 11 show: an operation procedure for inputting (editing) information to be displayed through a message board function by using, for example, a removable recording medium (detachable recording medium); and a configuration for doing so. An example of the removable recording medium is an SD memory card (SD memory card: registered trademark) and the like.

Incidentally, here, the configuration for doing so means a configuration shown by extracting or adding a necessary constituent element (s) from or to the constituent elements of the lighting device 300 detailed in FIG. 3. As is evident from FIG. 11, the configuration includes: a removable recording medium 1701A; a removable recording medium slot 1701B into which the removable recording medium 1701A is inserted; a removable recording medium control unit (removable recording medium IF) 1702; a microcomputer 1703 (corresponding to the control unit 110 of FIG. 3); a memory 1704 (corresponding to the memory 109 and the nonvolatile memory 108 of FIG. 3); a timer 1705; a person sensor 1706 (corresponding to the person sensor 302 of FIG. 3); a gesture sensor 1707; a lighting part 1708 (corresponding to the lighting unit 200 of FIG. 3); an LED driver 1709 (corresponding to the light emission element drivers A210, B220 of FIG. 3); an LED lighting 1710 (corresponding to the light emission elements A1 211 to Bm 223 of FIG. 3); a projector unit 1711 (corresponding to the projection-type video-image display unit 100 of FIG. 3); a panel driver 1712 (corresponding to the display element driving unit 103 of FIG. 3); a panel 1713 (corresponding to the display element 102 of FIG. 3); a projection optical system 1714 (corresponding to the projection optical system 101 of FIG. 3); a lighting optical system 1715 (corresponding to the lighting optical system 104 of FIG. 3); a light source 1716 (corresponding to the light source 105 of FIG. 3); and a light source driving unit 1717 (corresponding to the display element driving unit 103 of FIG. 3).

Here, the person sensor 1706 performs a function of being in an OFF state when there is no person in a predetermined place such as an interior of a room, being in an ON state when sensing a person, and returning back to the OFF state after a certain period of time.

In FIG. 10, an operator creates content to be displayed as a message, for example, by his/her own personal computer (PC) 1720A smart phone, or tablet terminal 1720B (operation on a PC, smart phone or tablet terminal side) (S161). Thereafter, the created content is copied to the removable recording medium 1701A (S162).

Subsequently, in the video-image projection function-equipped lighting device (operation on a device side), the operator sets the device to the ON state (S163). For example, this operation is done by using the above-described remote controller or a dedicated switch (operation panel 70 of FIG. 1 or 2). Thereafter, the removable recording medium 1701A is inserted into the removable recording medium slot 1701B of the device (S164). Furthermore, as will be described later, a message mode (timer setting condition, etc.) is set (S165). Then, the device is set to the OFF state (S166).

Thereafter, when the person sensor 1706 senses existence of a person, the above message is outputted and drawn by the projection-type video-image display unit 100 (S167). Incidentally, by using the above gesture sensor 1707 in this state, the displayed messages may be turned or sequentially displayed by toggle (S168). Then, when the person sensor 1706 senses that a person has left the device, the device is turned into the OFF state after a certain period of time (S169).

Figure 12:
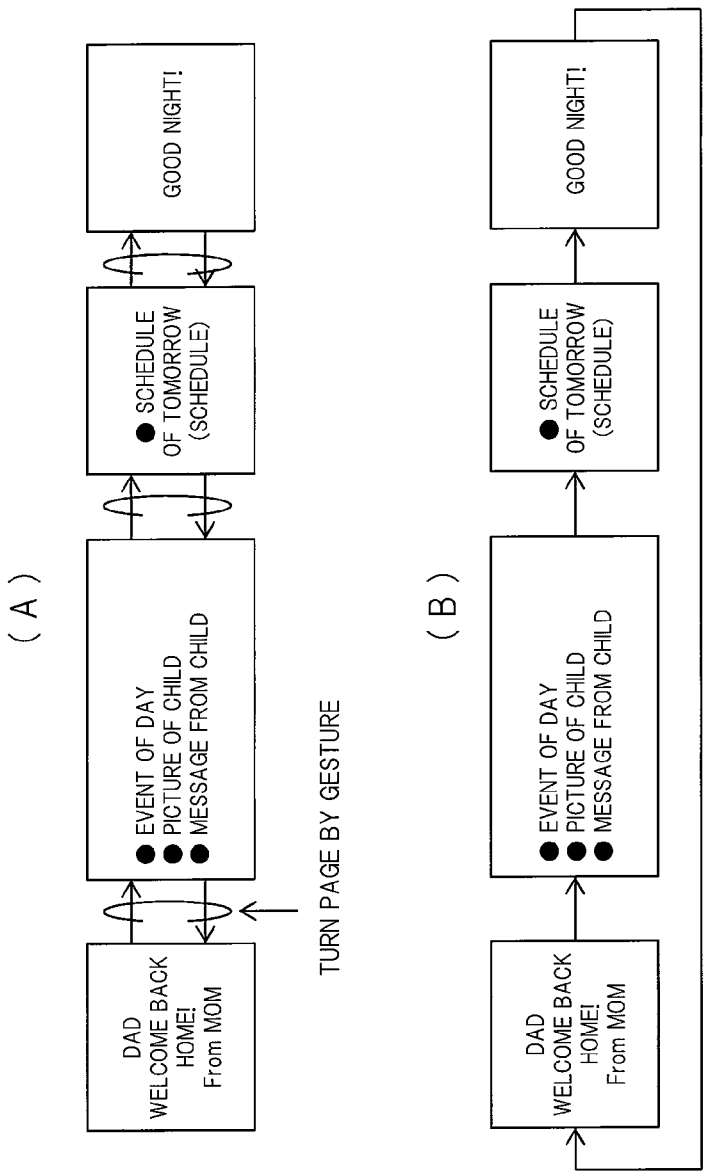
FIG. 12 is a diagram showing an example of messages of the above message board function.

FIG. 12 shows an example of the above message. FIG. 12(A) shows a case where the example operates in cooperation with the person sensor 1706 and the message can be switched by a gesture operation(s), the gesture operations by a hand(s) of the user being discriminated by using the gesture sensor 1707. In the figure, when the person sensor 1706 senses an approaching person(s), for example, the message "Dad, Welcome back home. From Mom" is outputted and drawn (see a left end of FIG. 12(A)). Thereafter, when the page is turned by gesture, the following message (in this example: • event of the day, • picture of the child, • message from the child) is outputted and drawn (see the second from the left end of the figure).

Furthermore, when the page is turned by gesture, the next message (in the present example, • schedule of tomorrow (timetable)) is displayed (see the third from the left end of the figure). Finally, the message "Good night" is outputted and drawn (a right end of the figure). In addition, FIG. 12(B) shows a case where the display of the above messages is sequentially displayed by toggle.

Next, an example of a message mode (timer setting condition etc.) of the above messages is shown in FIG. 13. More specifically, this is realized by: inserting time information (year, month, day, time) into message information created by the personal computer (PC) 1720A or the smartphone or tablet terminal 1720B described above in advance; inputting this time information into the microcomputer 1703 (see FIG. 11) via the above removable recording medium 1701A; and setting the timer 1705.

Incidentally, "specific day" in this figure may be associated with the person sensor 1706 in order to produce a surprise. Information to be outputted at a fixed time every day may be always outputted and drawn at a fixed time without being associated with the person sensor, or may be outputted and drawn when a person comes into proximity in association with the person sensor.

In addition, when a message is sent to a specific person, for example, a face is detected by the camera of the operation detection sensor 350 (see FIG. 3) as an identification sensor in order to specify a recipient; the person is specified; and thereafter the face may be outputted and drawn in association with the person sensor 1706.

By causing the lighting device 300 to be associated with the projection-type video-image display unit 100, for example, it is also possible to: make the lighting device 300 the OFF state in a bright daytime when the message is outputted and drawn; and contrarily make the lighting device 300 the ON state in a time zone after the evening even when the message is outputted and drawn. However, when the outputted and drawn information (characters, video images, etc.) is difficult to see, the lighting device 300 may be turned off. In this way, the ON state or the OFF state of the lighting device 300 can be set according to time. Alternatively, for example, the lighting device 300 may be turned into the ON state in using a brightness sensor to sense predetermined brightness or less.

Furthermore, the operation detection sensor 350 shown also in FIG. 3 can be used as the gesture sensor 1707 described above. That is, the operation detection sensor 350 is a camera for photographing a range that includes the video-image projection region on the display surface 61. By detecting even an invisible light beam such as an infrared light component, reflection light by an operation object can be detected. It is also possible to capture some of visible light components (i.e., display screen projection video images) other than an infrared light beam together with the infrared light components. Therefore, by inputting the detection signal from the operation detection sensor 350, it is possible to realize a discrimination processing of the gesture operation by the hand of the user in the vicinity of the video-image projection region.

Next, another example of the message board function of the projection-type video-image display unit 100 in the above-described video-image projection function-equipped lighting device according to the present invention will be described including its operation method with reference to FIG. 14 and FIG. 15. Incidentally, the same reference numerals in these figures are denoted for the same constituent elements as those described above, and therefore explanation thereof will be omitted for the purpose of avoiding redundant descriptions.

As can be understood from the figures in the present embodiment, the content to be displayed as a message created by the own personal computer (PC) 1720A or the smart phone or tablet terminal 1720B is input to the video-image projection function-equipped lighting device wirelessly (wireless communication means) such as Bluetooth or DLNA (Digital Living Network Alliance) instead of the above removable recording medium 1701A. That is, as shown also in FIG. 15, the lighting device 300 is provided with a wireless interface 2101 instead of the SD removable recording medium slot 1701B described above. Incidentally, other configurations are the same as those in FIG. 11.

In the present embodiment having the above configuration, as shown in FIG. 14, the operator first creates, as an operation on a PC side, content (=message) by the personal computer (PC) 1720A or the smart phone or tablet terminal 1720B (S161), and then turns, as an operation on a device side, the device into the ON state (S201) by the above remote controller or exclusive switch (the operation panel 70 in FIG. 1 or FIG. 2).

Thereafter, the operator sets, again as the operation on the PC side, wireless connection between the above personal computer (PC) 1720A or smartphone or tablet terminal 1720B and the device (=video-image projection function-equipped lighting device) (S202), and further transfers the above-created data (i.e., content=message) to the device side (S203). Thereafter, a process from a step of setting the message mode (S165) to a step of turning the device into the OFF state after a certain period of time by the person sensor (S169) is the same as above, and so a detailed description thereof will be omitted here. The display of the message in the present embodiment is similar to that of FIG. 12(A), and so a detailed description thereof will be omitted here. As shown in FIG. 12(B) also in the present embodiment, the message may be sequentially displayed by toggle.

As is apparent from the above description, the above embodiment can realize a more effective usage form by combining the lighting function and the message board function in the video-image projection function-equipped lighting device of the present invention. Although not shown here, the above embodiment is also considered so as to be able to display a message adapted to the person by identifying the ID of the personal computer (PC), smartphone, tablet terminal, or the like used for creating the content and by changing the content to be displayed (=message). Alternatively, similar effects can be obtained by using cameras to made face recognition instead of discrimination of the ID.

<Interactive Function>

Next, described below will be an embodiment in which the lighting unit 200 is controlled together with the projection-type video-image display unit 100 of the lighting device 300 by using the interactive function by the operation detection sensor without relying on the remote controller for controlling those.

FIG. 16 shows the overall configuration of the present embodiment. As can be understood from the figure, attached to a portion of a bottom surface portion of the so-called pendant-type lighting device 10 in the video-image projection function-equipped lighting device of the present invention is an operation detection sensor 2201 facing the upper surface (display surface or projection surface) 61 of the table or the desk. The reference symbol "70" in the figure denotes an operation panel (wall-surface operation input unit) attached to a wall or the like. The reference symbol "190" denotes a terminal (hooking ceiling, lighting rail, and the like) for attaching the pendant-type lighting device 10 to the ceiling and supplying power. This figure shows a state in which the lighting unit 200 of the above lighting device 10 performs LED lighting and the projection-type video-image display unit 100 projects a screen (in particular operation initial screen) on the display surface 61.

Incidentally, the above operation detection sensor 2201 in the present embodiment is a sensor for detecting a user's gesture and user's touch on the upper surface (display surface or projection surface) 61 of the desk which is the video-image projection surface. A specific configuration of the operation detection sensor 2201 may be an operation detection sensor of a TOF (Time of Flight) type, a camera-type operation detection sensor, or the like. The operation detection sensor of the TOF type may be constituted by using a technique disclosed in, for example, Japanese Patent Application Laid-Open No. 2009-258569. The camera-type operation detection sensor may be constituted by using a technique disclosed in, for example, Japanese Patent Application Laid-open No. 2014-174833.

In the present embodiment, an input from the operation detection sensor 2201 is used for a detection processing to the touch and the gesture operation by user's hand near the video-image projection region.

FIG. 17 shows a configuration for realizing an interactive function of the present embodiment. Incidentally, the configuration therefore is shown by extracting or adding a constituent element(s) particularly required for the present embodiment from among the constituent elements of the lighting device 300 detailed in FIG. 3 described above, and since the configuration is common to that in FIG. 11, only the added constituent elements will be described. That is, the present embodiment constitutes the operation detection sensor 2201 for detecting a touch operation(s) and a gesture operation(s) of the user. The touch operation detected by the operation detection sensor 2201 is inputted to the microcomputer 1703.

Further, the present embodiment includes: a voice processing unit 2405 to which an output(s) from the microcomputer 1703 is inputted; and a speaker 2406 for converting a voice signal (s) from the voice processing unit into a sound(s) and outputting the converted sound. As can be understood from the figure in the present embodiment, when the microcomputer 1703 outputs a keystone adjustment signal (s) to a panel driver 1712 of a projector unit 1711 and a color temperature adjustment signal(s), an ON/OFF signal(s), and a brightness adjustment signal (s) are outputted to a LED driver 1709 of a lighting unit 1708.

Furthermore, here, when the above-described operation detection sensor 2201 is a camera-type operation detection sensor, an example of a method (invisible-light-source two-light-beam and one-camera type sensor) for detecting that a finger F of the user's hand comes into contact with the display surface 61 (that is, a touch operation) will be described with reference to FIG. 18 and FIG. 19.

Incidentally, details of an operation of this method are disclosed in Japanese Patent Application Laid-open No. 2014-174833. First, as shown also in FIG. 18 and as indicated by solid lines, the operation detection sensor 2201 of this method includes a camera unit 2201A and a plurality of invisible light sources 2202B. The invisible light source 2202B is a light source different from the semiconductor light emission element (LED) 22 of the lighting unit 200. Invisible light such as infrared light is emitted to the downward direction from the invisible light source 2202B, and this is lighting by so-called multiple light sources. On the other hand, attached onto the bottom surface portion of the lighting device 10 is the camera unit 2201A of the operation detection sensor 2201 capable of imaging in a wavelength range of the invisible light. As indicated by broken lines in the figure, the camera unit 2201A photographs a video image(s) falling within a desired range on the display surface 61. The figure shows a case where a finger F of the user's hand is not in contact (touching) on the display surface 61 (left side in the figure) and a case where the finger F of the user's hand is in contact (touching) on the display surface 61 (right side in the figure).

On the other hand, FIGS. 19(A) and 19(B) show each position of the finger F of the user's hand as shown in FIG. 18, i.e., a state (shape) of a shadow(s) of the finger F formed on the display surface 61 in a case where the finger F of the user's hand is not in contact (touching) on the display surface 61 (left side in the figure) and a case where the finger F of the user's hand is in contact (touching) on the display surface 61 (right side in the figure). More specifically, when the finger F is not in contact (touching) on the display surface 61 as shown also in FIG. 19(A) the state (shape) of the shadow of the finger F is separated from its tip portion, and when the finger F is in contact (touching) on the display surface 61 as shown also in FIG. 19(B), the shadow of the finger F is integrated (approaches within a predetermined distance).

Therefore, the operation detection sensor 2201 can detect the gesture operation of the user's hand by detecting that a distance (s) from the plural shadows of FIG. 19 approaches within the predetermined distance, particularly, defect the touch operation by the finger F. In addition, since the plurality of invisible light sources 2202B use invisible light beams such as infrared rays, the configuration can be made without affecting the illumination light of the lighting unit and the projection video image of the projection-type video-image display unit 100 to the user.

Further, in the interactive function described above, an example of transition from the projection-type video-image display unit 100 to the screen projected onto the display surface 61 is shown in FIGS. 20(A) to 20(D). It should be noted that FIG. 20(A) shows a region (sensing area) previously set on the display surface 61 in order to realize the above interactive function. In this example, the display surface 61 is divided into 4×6=24 equal square areas (A(1, 1) . . . A(4, 6)).

FIG. 20(B) shows an example of an initial screen in the interactive function. In this example, an example of using four adjacent areas out of the above-described 24 areas to display each area is shown. For example, six selectable displays, "message", "LED/PJ control", "music", "picture", "motion picture", and "Web" are indicated on the display surface 61. In this state, the display selected by the user is decided by the interactive function. As a result, as shown in FIG. 20(C), the content corresponding to the decided display is displayed.

In this example, in FIG. 20(B), the user selects (touches) "LED/PJ control". As a result, in FIG. 20(C), "lighting control" for controlling the LED which is the light source of the lighting unit 200 and "projector control" for controlling the projection-type video-image display unit 100 are displayed on the upper portion of the display surface 61. Thereafter, the user can select either "ON" or "OFF" in relation to "lighting" displayed below the "lighting control", and/or select any one of "1", . . . , "5" in relation to "brightness". The stepwise display of "brightness" need not be a number. The number indicating the stepwise display may not be five, and may be two or more.

On the other hand, regarding the "projector control", the "ON/OFF" related to the lighting, furthermore, "Keystone" and/or "Color Adjust" can be selected. When these selections are completed, the display on the display surface 61 transits to the next level. Incidentally, if the user wants to return to the previous display screen, the user may select (touch) "return".

Incidentally, in the operations described above, when the user particularly wants to turn "off" the lighting of the projection-type video-image display unit 100 in "projector control", it is desirable to check the above again on the display surface 61 as shown in FIG. 20(D). This is because icons of the operations disappear once the projection of the projector is turned off, and a series of operations on the projection surface 61 ends. Incidentally, when the projector is restarted, it can be done with the remote controller or the wall switch 71 (FIG. 16) or the like. On the other hand, when the lighting unit 200 is to be turned "off" in the "lighting control", it is preferable to turn "off" without confirming the above.

According to the video-image projection function-equipped lighting device which becomes the present invention with the interactive function described above, both control of the projection-type video-image display unit 100 constituting the lighting device 300 and control of the lighting unit 200 integrated with the projection-type video display unit within the lighting device 300 can be performed through the touch detection of the video image projected onto the display surface 61 by the projection-type video-image display unit 100 without using the above remote controller or dedicated switch (operation panel 70 in FIG. 1 or FIG. 2). This makes it possible to remarkably improve operability for the user and to improve convenience of the device together with operability of the device.

Alternatively, instead of an operation detection means including the operation detection sensor 2201 of FIG. 16 or FIG. 18, an operation detection sensor 2701 may be arranged on the display surface 61 as shown in FIG. 21. FIG. 21 describes an example in which the operation detection sensor 2701 of a TOF (Time Of Flight) type is arranged as the operation detection sensor 2701.

FIG. 25 shows a circuit configuration for realizing a touch operation by a TOF sensor according to the present embodiment. An operation detection sensor 2701 of a TOF type in this figure is a two-dimensional distance measuring camera of an infrared TOF type. A TOF (Time of Flight Measurement) method, which is the measurement principle, measures a time taken until a time-modulated infrared ray emitted from an infrared laser 3000 on a front surface is reflected on a target object and returned, thereby obtaining a distance to an object therefrom. More specifically, the Laser 3000 incorporated in the operation detection sensor 2701 of the TOF type is made to scan in two dimensions; the reflection light is detected by a photodiode 3001; and a ranging IC 3002 measures a flight time of light. Detected TOF information is wirelessly transmitted from a wireless transmission unit 3004; a wireless reception unit 3005 arranged in the lighting device 300 receives the TOF information; and a touch detection unit 2304 detects an area touched.

Incidentally, this figure has described a configuration example in which the operation detection sensor 2701 of the TOF method and the lighting device 300 are connected by wireless communication. However, those may be connected via wires. Also in the figure, the lighting unit 200 of the above lighting device 10, which is connected to a terminal (hooking ceiling, lighting rail, etc.) 190 for supplying power and is attached to the ceiling, performs LED lighting, and the projection-type video-image display unit 100 projects a screen (particularly, operation initial screen) on the display surface 61. Furthermore, an emission range of the infrared laser light from the operation detection sensor 2701 of the TOF type is denoted with "L", and a position of the finger is denoted with "F". As to delivery of the TOF information by the above wireless, the output of the operation detection sensor 2701 of the TOF type is transferred (wirelessly connected) via the wireless of Bluetooth, DLNA (Digital Living Network Alliance) or the like as shown by the broken line in the figure to the projection function-equipped lighting device 300.

As described above, the operation detection sensor 2701 of the TOF type performs a discrimination processing of the touch operation by the hand of the user in the vicinity of the video-image projection region.

<Example of Using Vibration Sensor>

Subsequently, in the video-image projection function-equipped lighting device of the present invention, an embodiment using a vibration sensor will be described below with reference to FIG. 22 to FIG. 24. Incidentally, here, an example in which a piezo vibration sensor, a triaxial acceleration sensor, or the like is adopted as a vibration sensor will be described.

FIG. 22 shows a configuration for realizing a lighting device having a vibration sensor according to the present embodiment. Incidentally, the configuration for realization is shown by extracting or adding constituent elements particularly required for the present embodiment from among the constituent elements of the lighting device 300 detailed in FIG. 3 described above, and since the configuration is common also to that in FIG. 11, only the added constituent elements will be described. That is, the present embodiment is provided with a vibration sensor 2801 instead of the person sensor and the gesture sensor. Although not shown in FIG. 22, the person sensor and the gesture sensor together with the vibration sensor may be adopted as the constituent elements of the video-image projection function-equipped lighting device. Incidentally, here, the description of other configurations will be omitted to avoid duplication.

FIG. 23 shows an appearance of a video-image projection function-equipped lighting device 10 with a vibration sensor. In this example, the above-described vibration sensor 2801 is attached inside the lighting device 10 of the pendant-type. Incidentally, this example particularly shows an example in which a triaxial acceleration sensor is adopted as the vibration sensor 2801. In an upper portion of the figure, directions of three axes (x axis, y axis, z axis) are shown. Incidentally, due to a structure in the lighting device 10 of the pendant-type, when the triaxial acceleration sensor detects vibration, the vibration is mainly swing in an x-axis direction and/or a y-axis direction, and vibration in a z-axis direction hardly occurs.

Therefore, as shown in a waveform diagram of FIG. 24 in the present embodiment, two signals of an x-axis directional signal "ax" and a y-axis directional signal "ay" among output signals of the three axial directions outputted from the above-described triaxial acceleration sensor are used to detect the vibration. That is, when either one of these signals "ax" or "ay" exceeds a predetermined threshold (broken lines in the figure), occurrence of vibration is detected. Thereafter, when both of these signals "ax" and "ay" attenuates below the threshold, stop of vibration is detected. As shown also in the upper portion of the figure, when vibration occurs, the light source 1716 of the projector unit 1711 (see FIG. 22) in the lighting device 10 is set to the OFF state. Thereafter, when the vibration stops, the light source is set to the ON state.

That is, according to the video-image projection function-equipped lighting device having the above-described vibration sensor, the following effects are made. The following problem has been conventionally pointed out: for example, when the video-image projection function of the above lighting device is used at a time of occurrence of vibration such as earthquake, the video image projected onto the table, desk, and the like by the projector unit 1711 (see FIG. 22) also swings on the display surface due to the vibration of the lighting device 10, which makes it difficult to see the video image, and brings an increase in a sense of user's anxiety. In contrast, according to the video-image projection function-equipped lighting device having the vibration sensor which becomes the present embodiment, it is possible to solve the above-described problem by preventing (stopping) a video-image shake(s) at a time of vibration occurrence. A screen shake(s) can be prevented when the user mistakenly hits the lighting device, and the device can be used more comfortably.

The video-image projection function-equipped lighting devices which become various embodiments of the present invention have been hereinabove described. However, the present invention is not limited to the embodiments described above and includes various modification examples. For examples, the embodiments above have been described in detail so as to make the present invention easily understood, and the present invention is not always limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

REFERENCE SIGNS LIST

10 . . . lighting device; 11 . . . main body (housing) (shade); 12 . . . diffusion plate; 20 . . . illumination light source; 22 . . . semiconductor light emission element (LED); 300 . . . lighting device; 100 . . . projection-type video-image display unit; 200 . . . lighting unit; . . . 1701A . . . removable recording medium; 1701B . . . removable recording medium slot); 1702 . . . removable recording medium control unit (removable recording medium IF); 1720A . . . personal computer (PC); 1720B . . . smartphone or tablet terminal; 1706 . . . person sensor; 1707 . . . gesture sensor; 1705 . . . timer; 2101 . . . wireless interface; 350 . . . operation detection sensor; 2201 . . . operation detection sensor; 2304 touch detection unit; 2701 . . . operation detection sensor; and 2801 vibration sensor

The invention claimed is:

1. A lighting device comprising:
 a lighting unit emitting illumination light;
 a projection-type video-image display unit projecting a video image;
 a timer;
 a controller;
 an information acquiring interface;
 wherein message information is created by an external device via the information acquiring interface, the message information being associated with a date and time condition and a lighting state condition of the lighting unit which is different from that of the projecting-type video-image display unit;
 when satisfying the date and time condition associated with the message information, the controller controls a lighting state of the lighting unit so as to become a state of satisfying the lighting state condition and displays a message that the message information indicates by the projecting-type video-image display unit; and,
 the date and time condition includes a condition for specifying a specific day, and the lighting state condition of the lighting unit includes a condition involving identification of whether a time of displaying the message by the projecting-type video-image display unit in accordance with a person sensor of the lighting device is daytime or nighttime.

2. The lighting device according to claim 1, wherein the information acquiring interface is a removable recording medium interface acquiring the message information from a removable recording medium.

3. The lighting device according to claim 1, wherein the information acquiring interface is a wireless communication interface acquiring the message information from the external device by wireless communication.

4. The lighting device according to claim 1, further comprising:
 a person sensor detecting an approaching person; and
 an identification sensor identifying the approaching person,
 wherein the identification sensor identifies the person detected by the person sensor, and
 the projection-type video-image display unit projects and displays the content of the video image in accordance with the person identified by the identification sensor.

* * * * *